US011477338B2

(12) United States Patent
Okawa et al.

(10) Patent No.: US 11,477,338 B2
(45) Date of Patent: Oct. 18, 2022

(54) ORIGINAL FEEDING DEVICE

(71) Applicant: CANON KABUSHIKI KAISHA, Tokyo (JP)

(72) Inventors: Satoshi Okawa, Ibaraki (JP); Chiaki Yoshiwara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/128,460

(22) Filed: Dec. 21, 2020

(65) Prior Publication Data

US 2021/0218856 A1 Jul. 15, 2021

(30) Foreign Application Priority Data

Jan. 15, 2020 (JP) .............................. JP2020-004750

(51) Int. Cl.
*H04N 1/04* (2006.01)
*H04N 1/00* (2006.01)

(52) U.S. Cl.
CPC ....... *H04N 1/00732* (2013.01); *H04N 1/0062* (2013.01); *H04N 1/00687* (2013.01); *H04N 1/00806* (2013.01)

(58) Field of Classification Search
None
See application file for complete search history.

(56) References Cited

U.S. PATENT DOCUMENTS

| 8,561,978 | B2 | 10/2013 | Takahashi et al. | |
| 10,124,969 | B2 | 11/2018 | Yoshiwara et al. | |
| 10,469,688 | B2 | 11/2019 | Xie et al. | |
| 10,518,995 | B2* | 12/2019 | Nakayoshi | B65H 7/20 |
| 11,122,167 | B2* | 9/2021 | Shiota | H04N 1/00734 |
| 2005/0169681 | A1* | 8/2005 | Hata | G03G 15/602 |
| | | | | 399/367 |
| 2009/0166953 | A1* | 7/2009 | Osakabe | B65H 7/02 |
| | | | | 271/18 |
| 2012/0113487 | A1* | 5/2012 | Murakami | H04N 1/00737 |
| | | | | 358/498 |
| 2014/0185063 | A1* | 7/2014 | Osakabe | B65H 7/00 |
| | | | | 358/1.2 |

(Continued)

FOREIGN PATENT DOCUMENTS

JP 2000-264445 A 9/2000

*Primary Examiner* — Dung D Tran
(74) *Attorney, Agent, or Firm* — Venable LLP

(57) ABSTRACT

An original feeding device includes a pick-up roller, a separation feeding unit, a first original presence/absence detecting sensor, a second original presence/absence detecting sensor and a control unit. When an original is detected by the first and second original presence/absence detecting sensors, the control unit discriminates that the original on the original tray has a first width. When the original is detected by the first original presence/absence detecting sensor but is not detected by the second original presence/absence detecting sensor, the control unit discriminates that the original has a second width smaller than the first width. After the control unit discriminates that the original has the second width and then feeding of the original is started, and then the original is detected by the second original presence/absence detecting sensor, the control unit stops the drive of the pick-up roller and the drive of the separation feeding unit.

6 Claims, 21 Drawing Sheets

(56) References Cited

U.S. PATENT DOCUMENTS

| | | | |
|---|---|---|---|
| 2015/0249763 A1* | 9/2015 | Mabara | H04N 1/00612 |
| | | | 358/488 |
| 2015/0288838 A1* | 10/2015 | Tanaka | H04N 1/00692 |
| | | | 358/474 |
| 2017/0041478 A1* | 2/2017 | Nakayoshi | H04N 1/00745 |
| 2018/0034991 A1* | 2/2018 | Osada | H04N 1/00652 |
| 2020/0385226 A1* | 12/2020 | Hishinuma | G03G 15/6567 |
| 2022/0086296 A1* | 3/2022 | Hiro | H04N 1/00724 |

* cited by examiner (a)

(b)

SATND-BY SCREEN

| READABLE | | | |
|---|---|---|---|
| AUTO (CLR/GRY) | 300x300dpi | AUTO | PDF |
| SELECT COLOR | PSLTN | READING SIZE | FILE FORMAT |
| CHR/PHT | DNSTY | ONE SIDE | FILE NAME |
| ORGNL KND | | BOTH SIDE | |
| CANCEL | | | OTR FNCTNS |

Fig. 9

ORIGINAL FEEDING DEVICE

FIELD OF THE INVENTION AND RELATED ART

The present invention relates to an original feeding device for feeding an original stacked on an original tray.

An image forming apparatus such as a copying machine or a multi-function machine includes an automatic document feeder (hereinafter referred to as an "ADF") for feeding an original (document) to an image reading portion. In some instances, such an ADF is liable to cause a jam and double (multiple) feeding due to weak stiffness of an original with a small size such as a business card or a check when compared with an original with a large size, or is liable to have a high feeding load due to strong stiffness. For that reason, in order to realize protection of the original, double-feeding prevention, prevention of insufficiency of a feeding speed relative to a reading speed, and the like, feeding control is changed in such a manner that the feeding speed is changed depending on a size of the original.

Original size information is acquired by operation input by a user in some instances, but when the size information is not inputted or when the inputted size information does not coincide with an actual original size, proper feeding control cannot be selected, and therefore, it is desirable that the original size is detected. Therefore, in Japanese Laid-Open Patent Application (JP-A) 2000-264445, a method in which the original size is discriminated on the basis of a position of a side restricting plate (sheet (paper) feeding guide) for restricting a position of the original with respect to a widthwise direction of the original and then a feeding speed of the original is changed has been proposed.

However, in order to detect the position of the side restricting plate by a sensor as in JP-A 2000-26444, there arises a need that a member and a sensor which are interrelated with the side restricting plate are provided inside the original tray provided with the side restricting plate. Particularly, the original tray in the ADF is provided so as to be rotatable for facilitating taking-out of the original discharged, but when the sensor is provided inside the original tray, wiring thereof becomes complicated, so that the provision of the sensor acts as an impediment to reduction in cost.

SUMMARY OF THE INVENTION

According to an aspect of the present invention, there is provided an original feeding device comprising: a pick-up roller configured to feed an original stacked on an original tray, in a feeding direction in contact with the original; a separation feeding unit configured to separate and feed the original fed by the pick-up roller, one by one in a separation nip; a first original presence/absence detecting sensor including a first detecting member provided downstream of an original contact position of the pick-up roller and upstream of the separation nip with respect to the feeding direction and configured to detect presence or absence of the original on the original tray by rotation of the first detecting member; a second original presence/absence detecting sensor including a second detecting member provided adjacent to the first detecting member with respect to a widthwise direction perpendicular to the feeding direction and configured to detect presence or absence of the original on the original tray by rotation of the second detecting member; and a control unit configured to control drive of the pick-up roller and drive of the separation feeding unit, wherein in a case that the original is detected by the first and second original presence/absence detecting sensors, the control unit discriminates that the original on the original tray has a first width and then controls the drive of the pick-up roller and the drive of the separation feeding unit so that the original is fed at a first feeding speed, in a case that the original is detected by the first original presence/absence detecting sensor but is not detected by the second original presence/absence detecting sensor, the control unit discriminates that the original has a second width smaller than the first width and then controls the drive of the pick-up roller and the drive of the separation feeding unit so that the original is fed at a second feeding speed slower than the first feeding speed, and in a case that after the control unit discriminates that the original has the second width and then feeding of the original is started, and then the original is detected by the second original presence/absence detecting sensor, the control unit stops the drive of the pick-up roller and the drive of the separation feeding unit to stop the feeding of the original.

Further features of the present invention will become apparent from the following description of exemplary embodiments with reference to the attached drawings.

Figure 2:
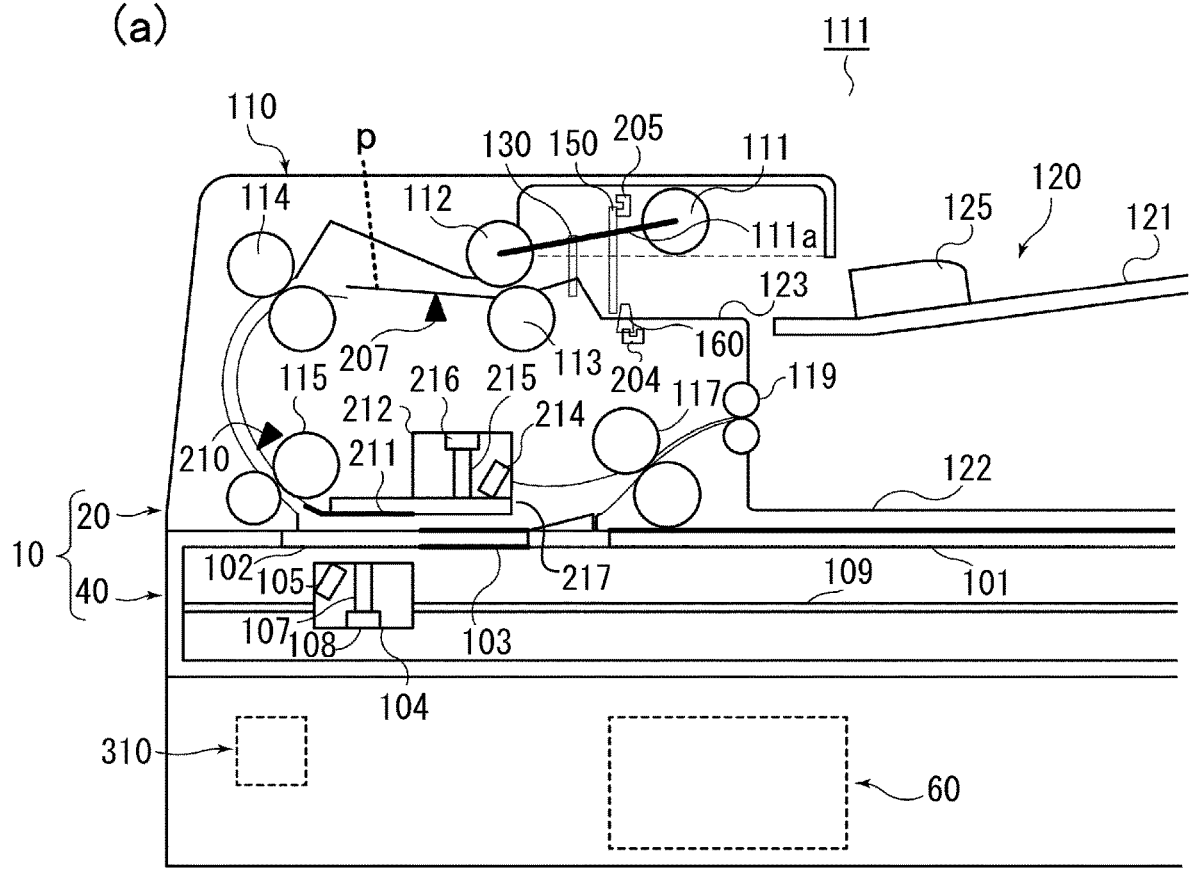
Figure 2:
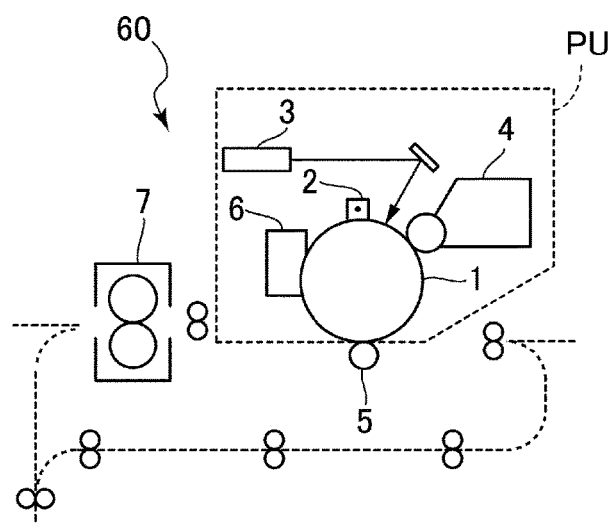

Part (a) of FIG. 2 is a schematic sectional view showing a printer provided with an ADF according to this embodiment, and part (b) of FIG. 2 is a schematic view showing an image engine.

Figure 3:
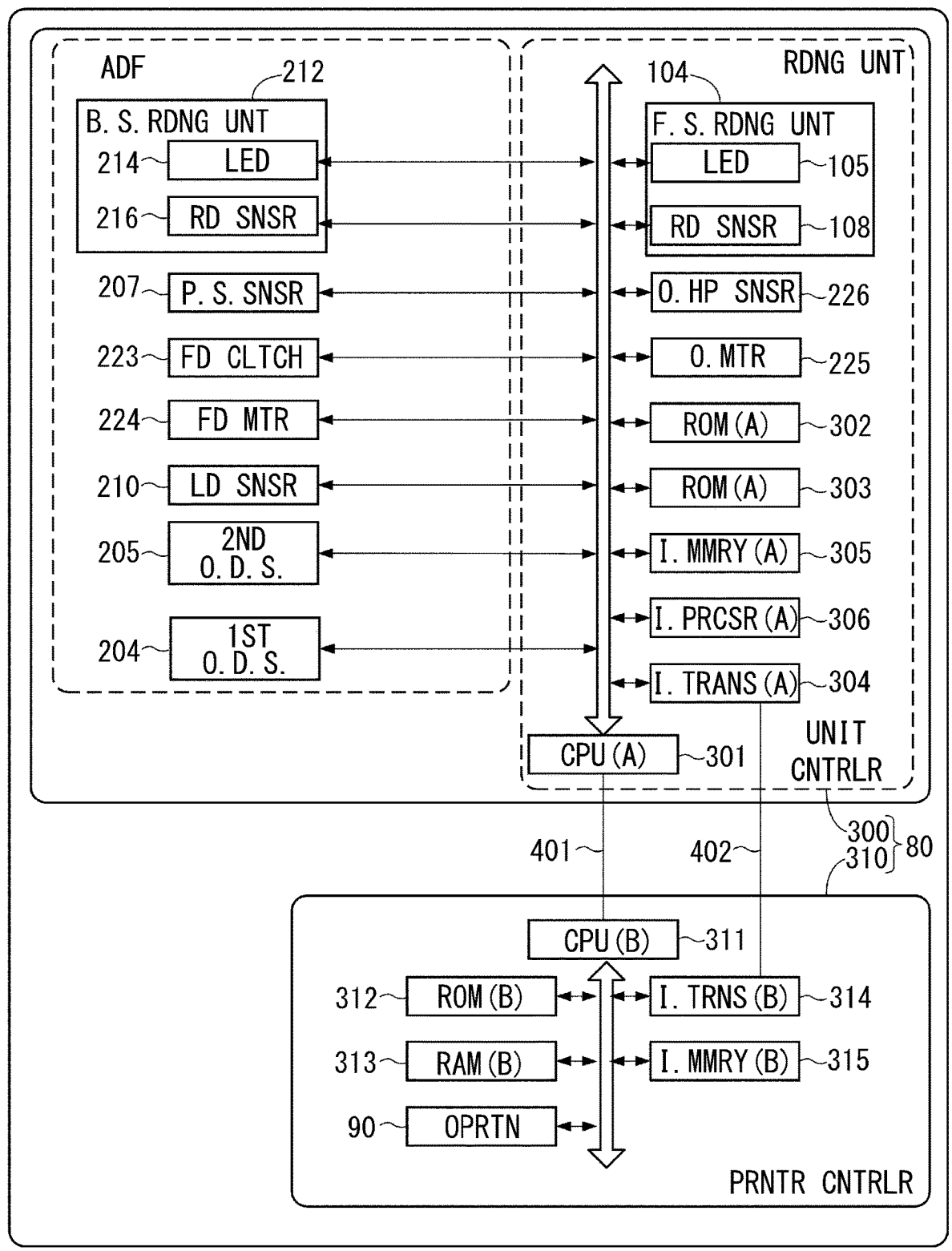

FIG. 3 is a block diagram showing a controller in this embodiment.

Figure 4:
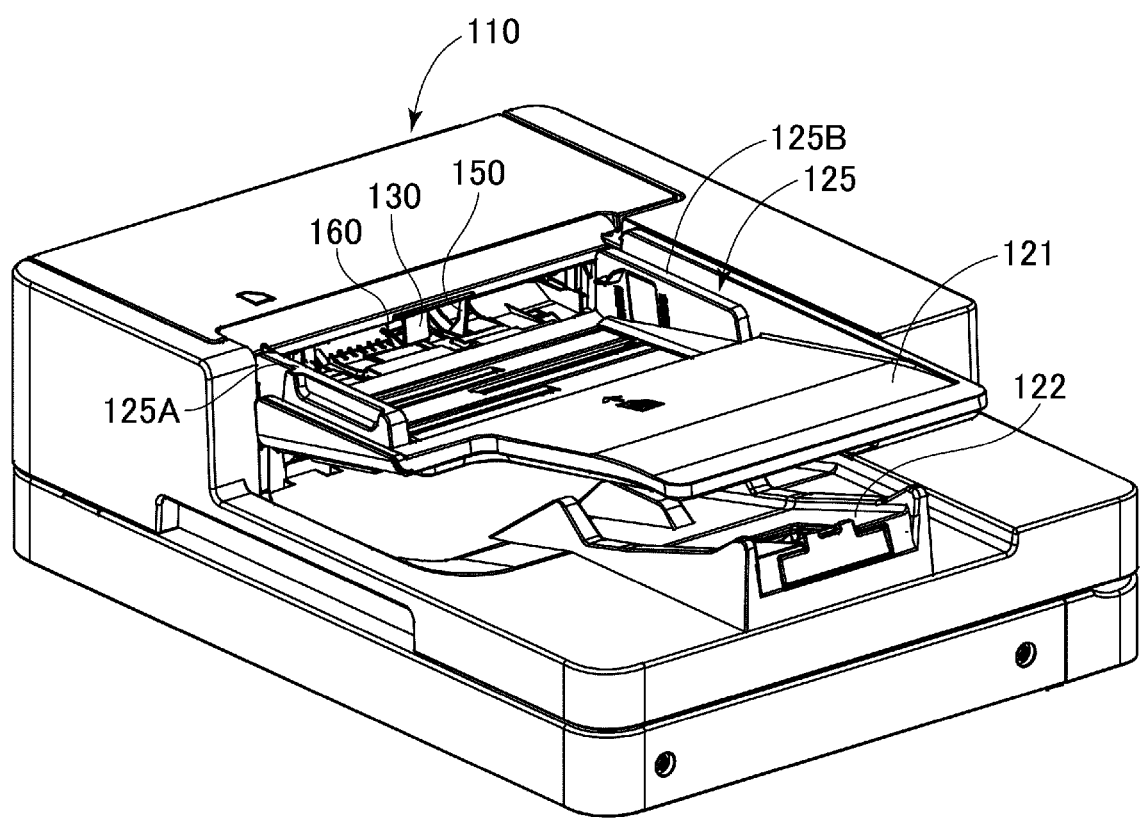

FIG. 4 is a general perspective view showing the ADF according to this embodiment.

Figure 5:
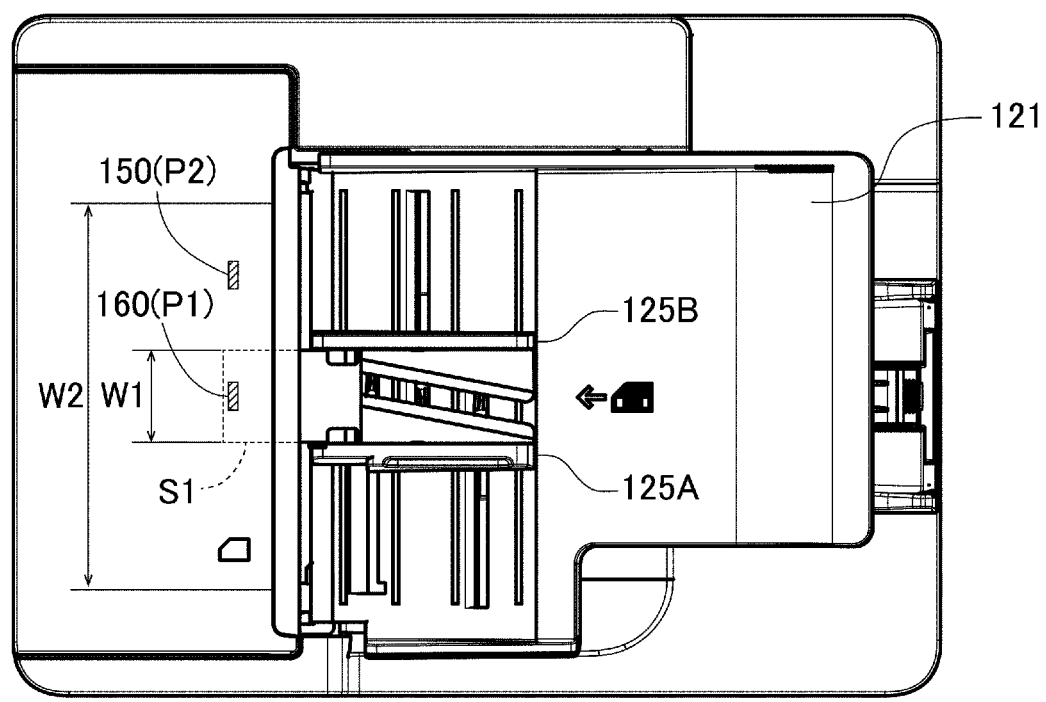
Figure 6:
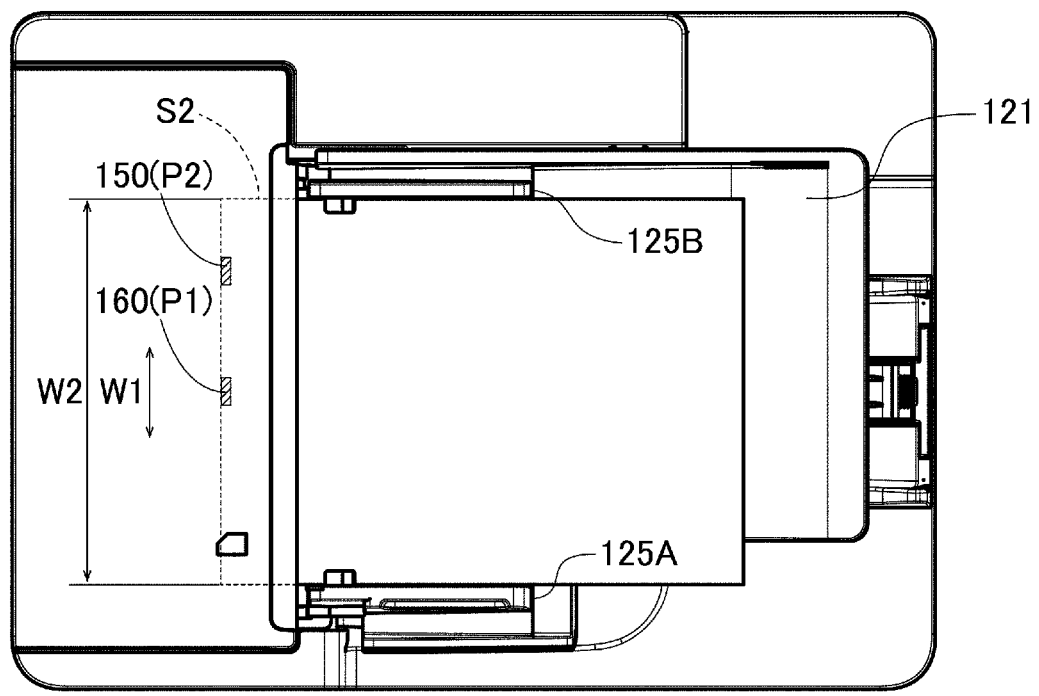

FIG. 5 is a top plan view showing the ADF in a state in which an original with a small size is set FIG. 6 is a top plan view showing the ADF in a state in which an original with a large size is set.

Figure 7:
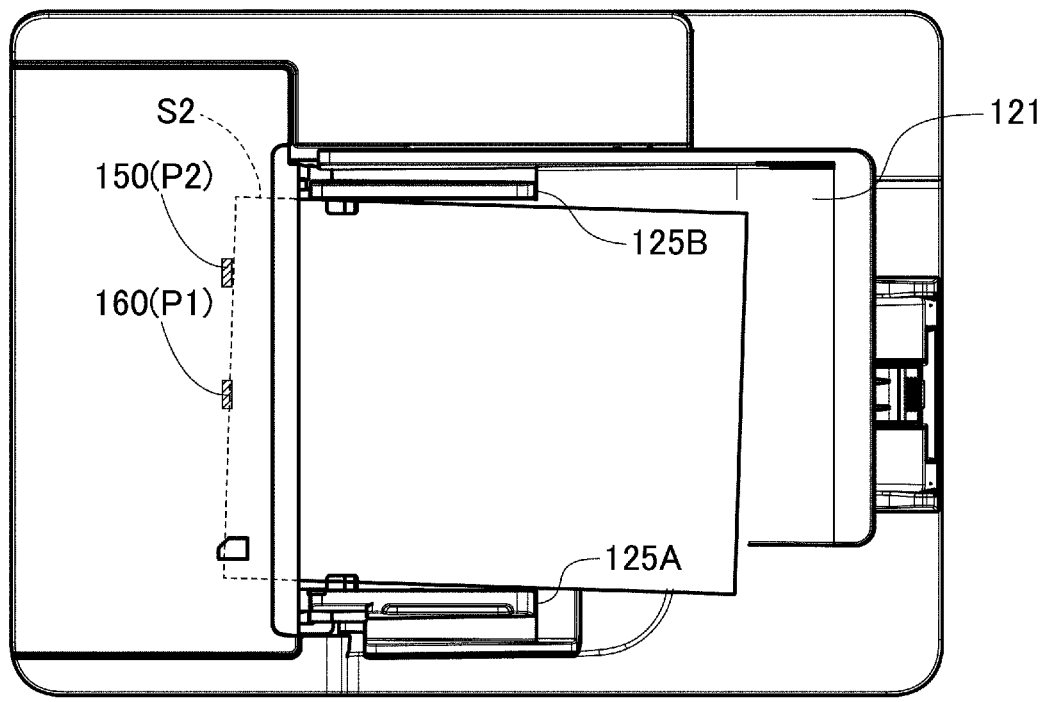

FIG. 7 is a top plan view showing the ADF in a state in which the original with the large size is obliquely set.

Figure 8:
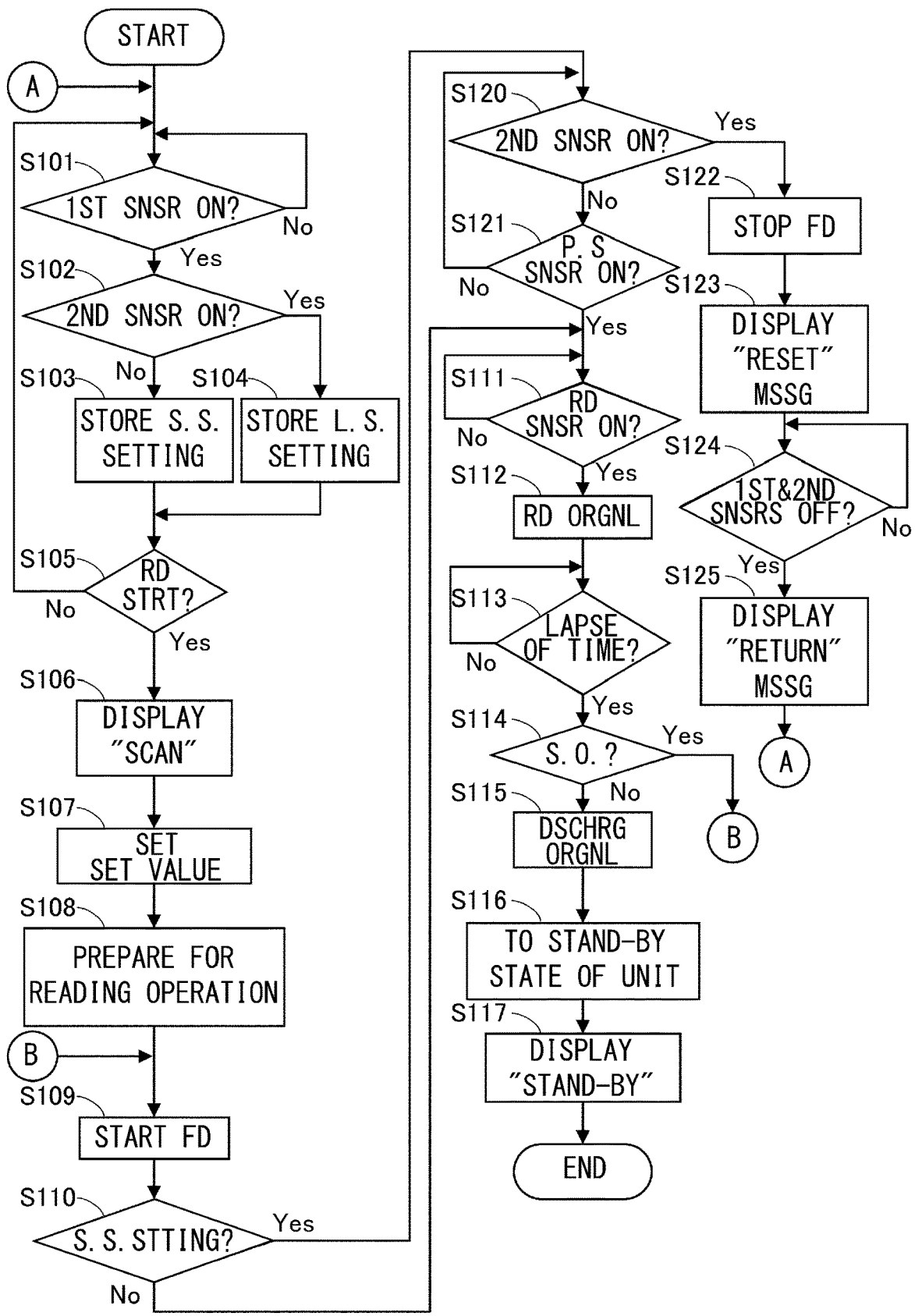

FIG. 8 is a flowchart showing original reading control in a first embodiment.

FIG. 9 is a schematic view showing a stand-by screen displayed on a display portion.

Figure 10:
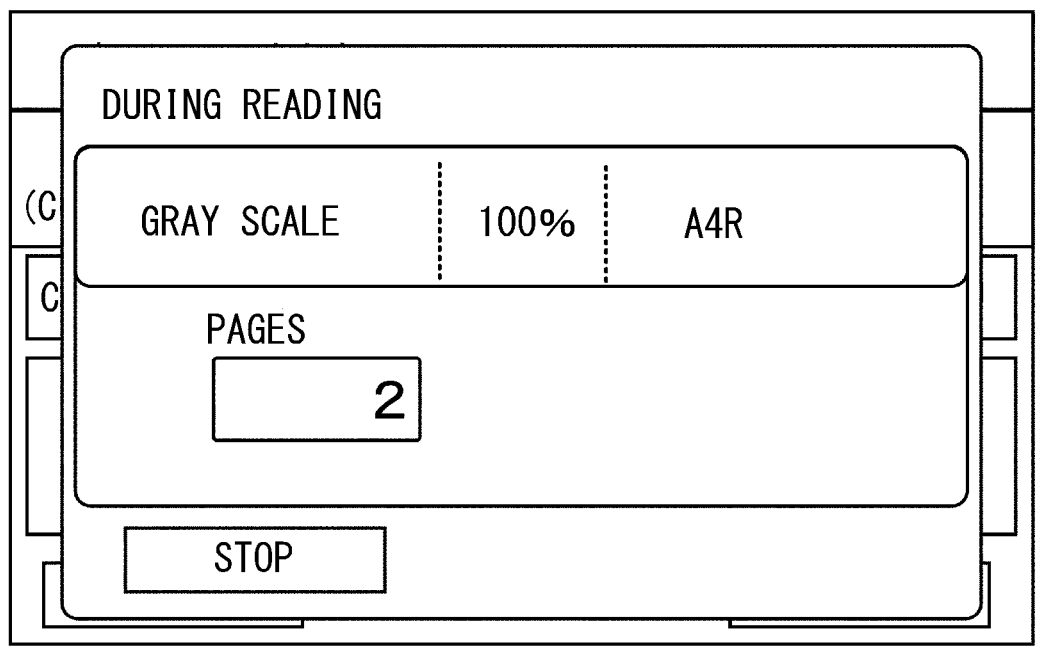

FIG. 10 is a schematic view showing a screen during scanning displayed on the display portion.

Figure 11:
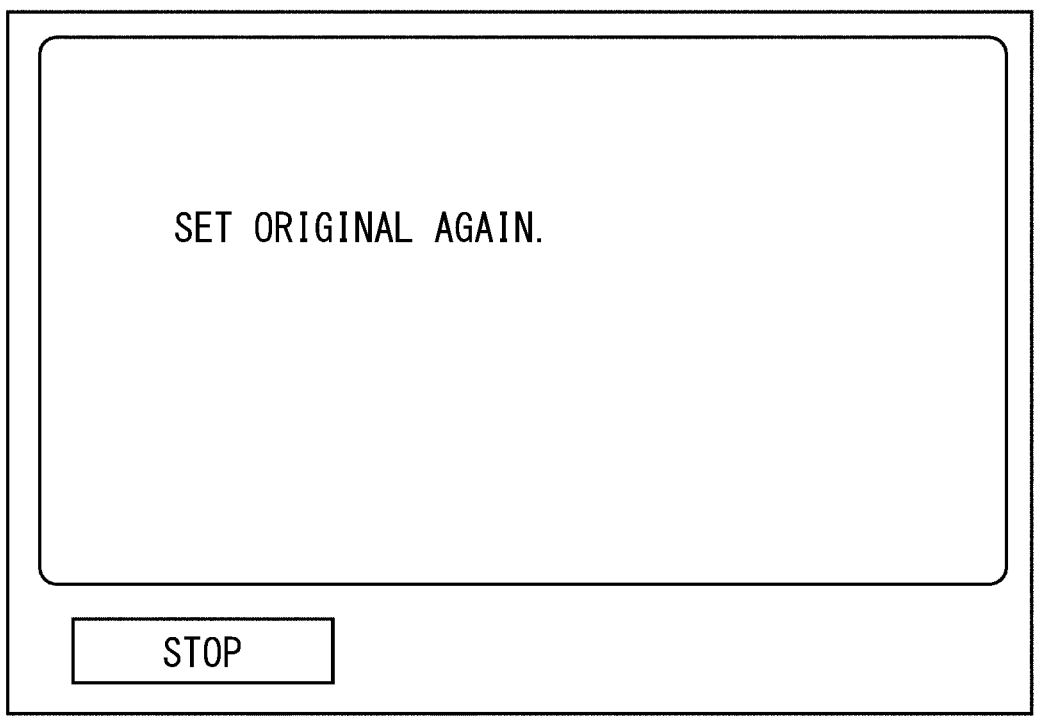

FIG. 11 is a schematic view showing a message screen, for reading setting of an original, displayed on the display portion.

Figure 12:
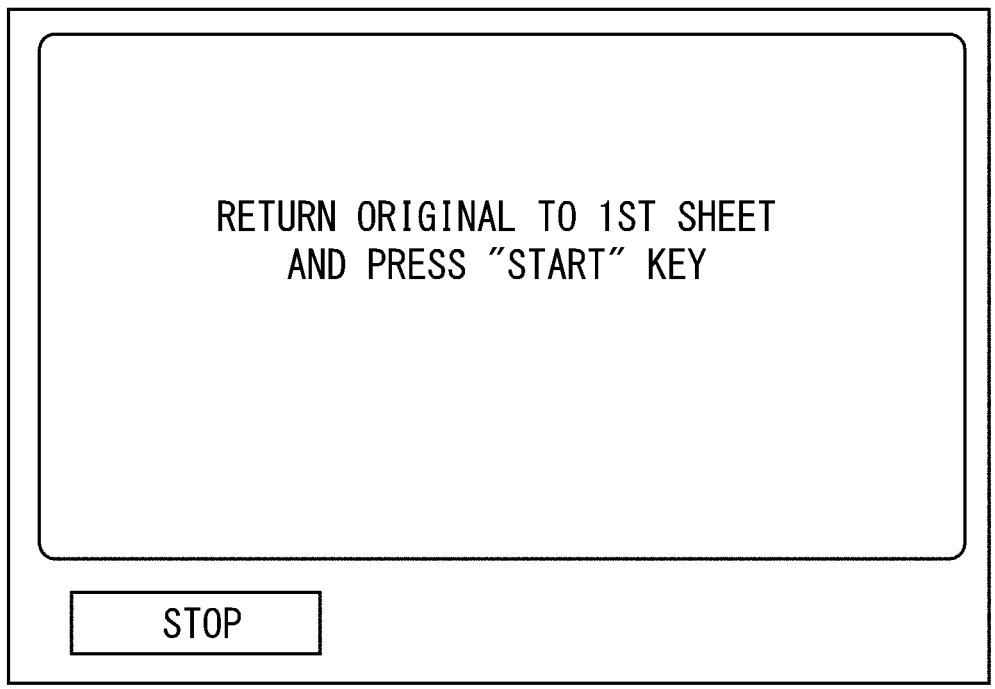

FIG. 12 is a schematic view showing a means screen, for returning an original to a first sheet, displayed on the display portion.

Figure 13:

FIG. 13 is a schematic view showing a message, in the case where the re-setting is in an improper state, displayed on the display portion.

Figure 14:
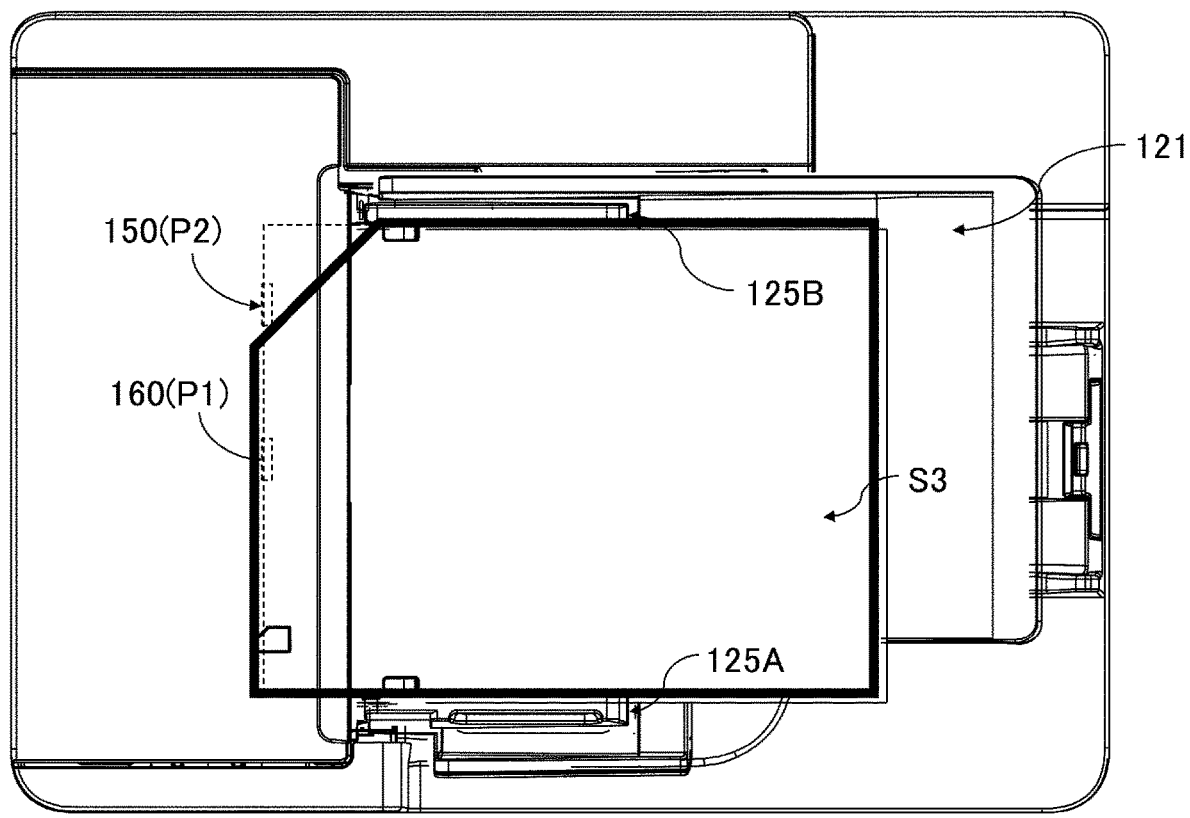

FIG. 14 is a top plan view showing the ADF in a state in which the original with the large size which creases at a corner thereof.

Figure 15:
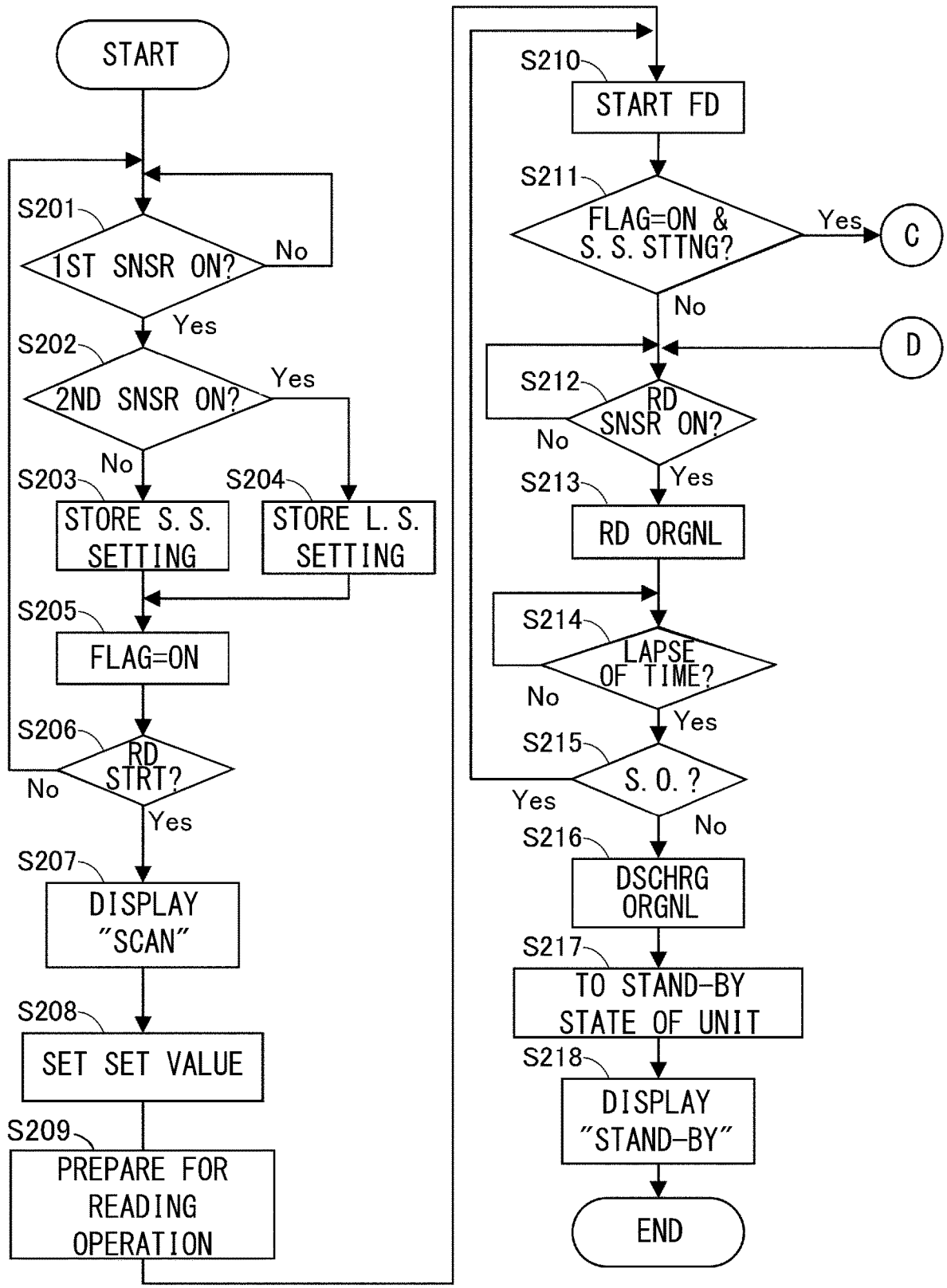

FIG. 15 is a flowchart showing a part of original reading control in a second embodiment.

Figure 16:
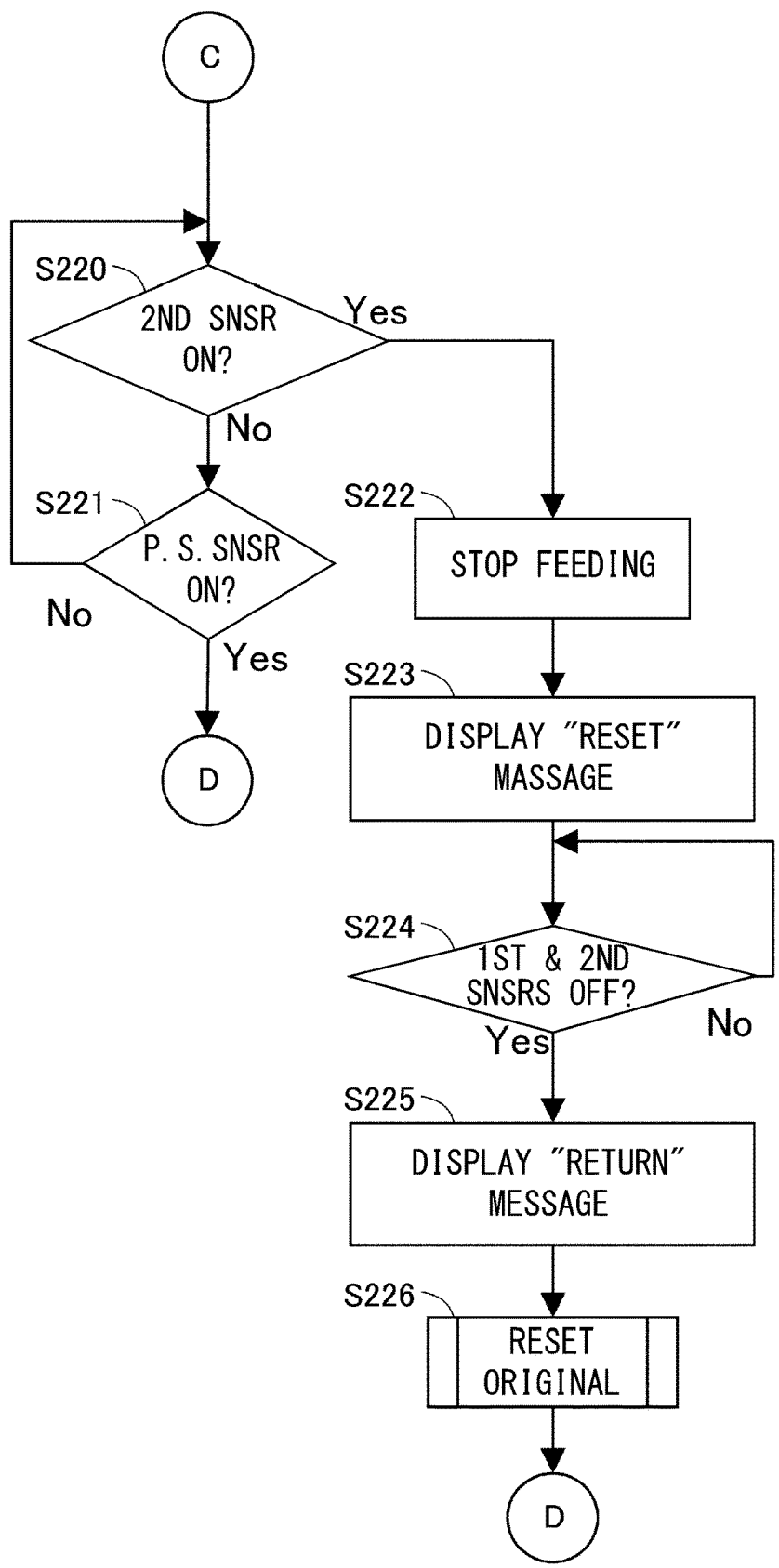

FIG. 16 is a flowchart showing a subsequent part of the original reading control in the second embodiment.

Figure 17:
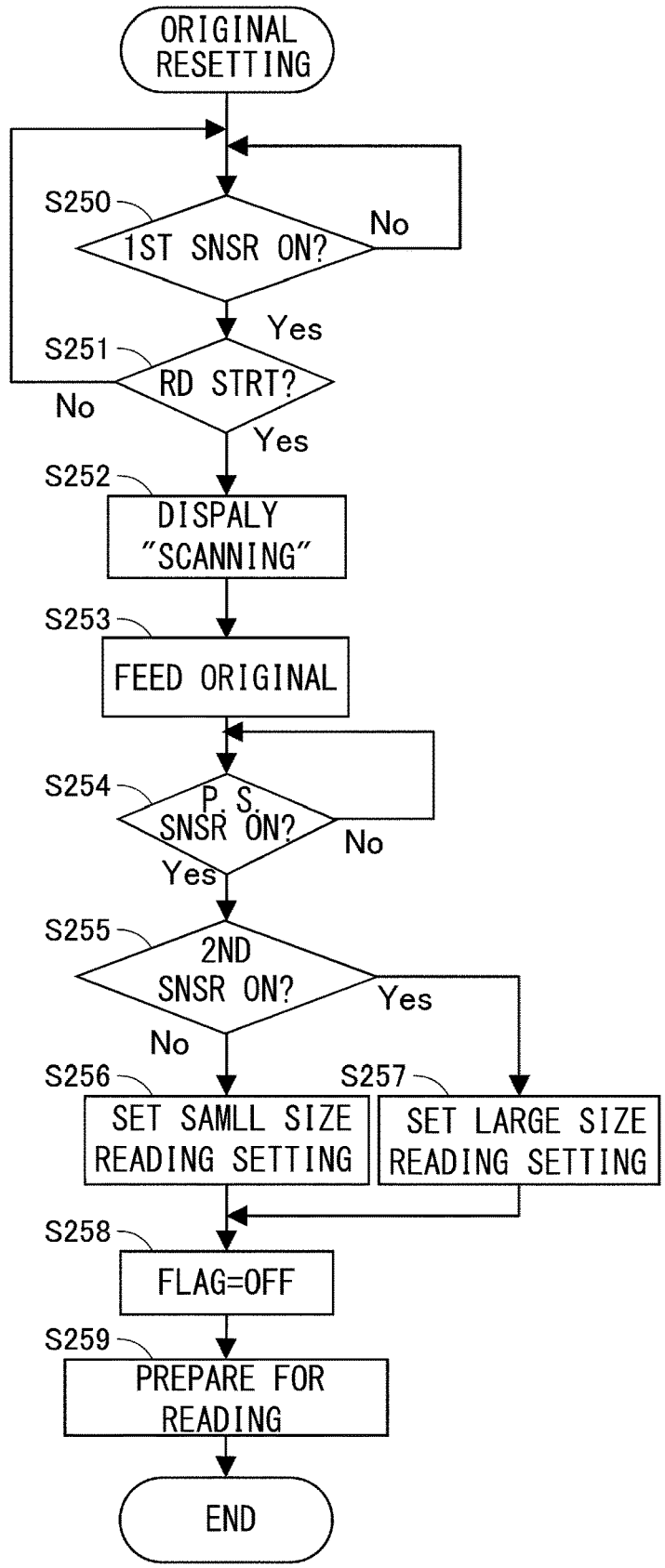

FIG. 17 is a flowchart showing an original re-setting process in the second embodiment.

Figure 18:
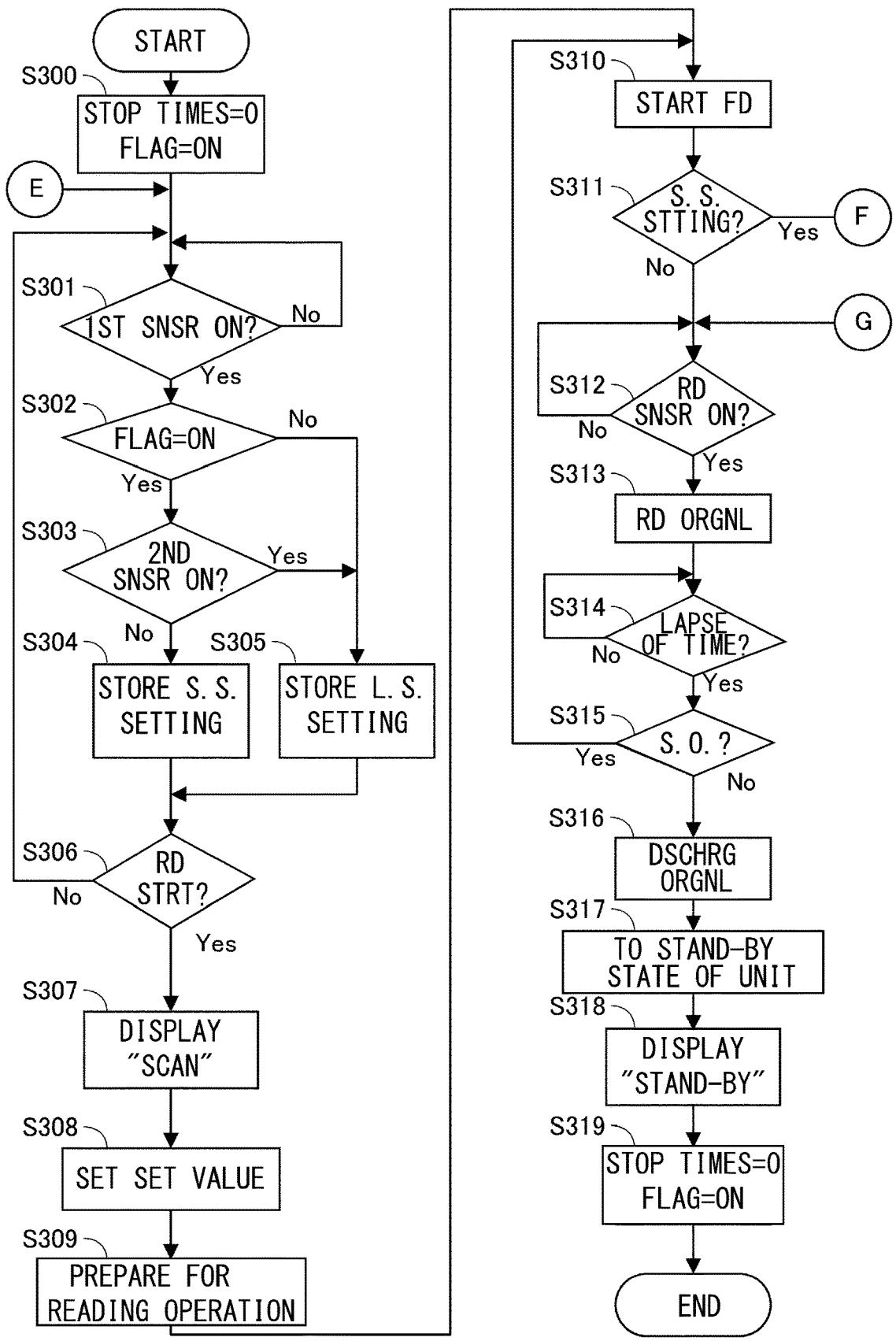

FIG. 18 is a flowchart showing a part of original reading control in a third embodiment.

Figure 19:
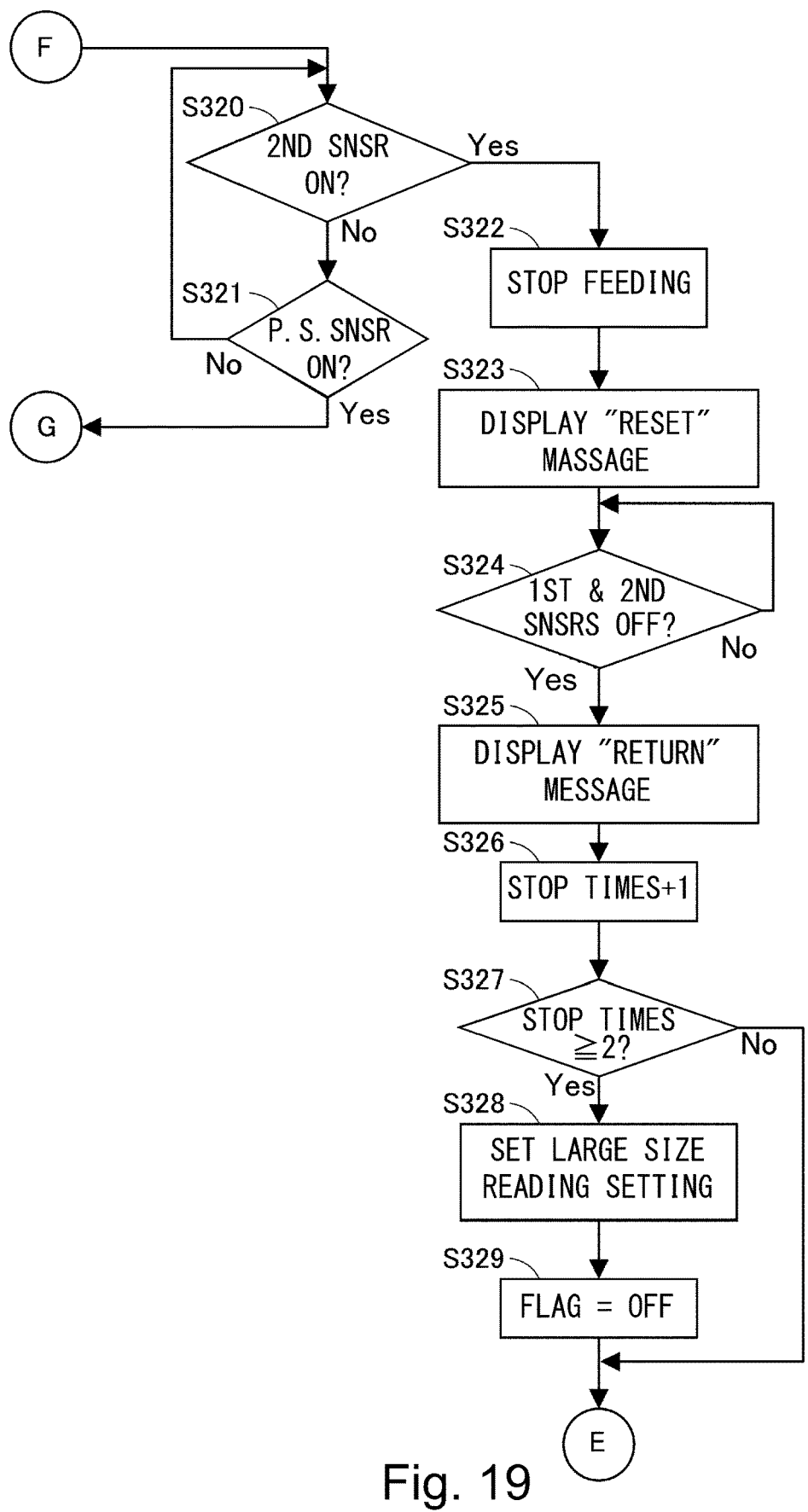

FIG. 19 is a flowchart showing a subsequent part of the original reading control in the third embodiment.

Figure 20:
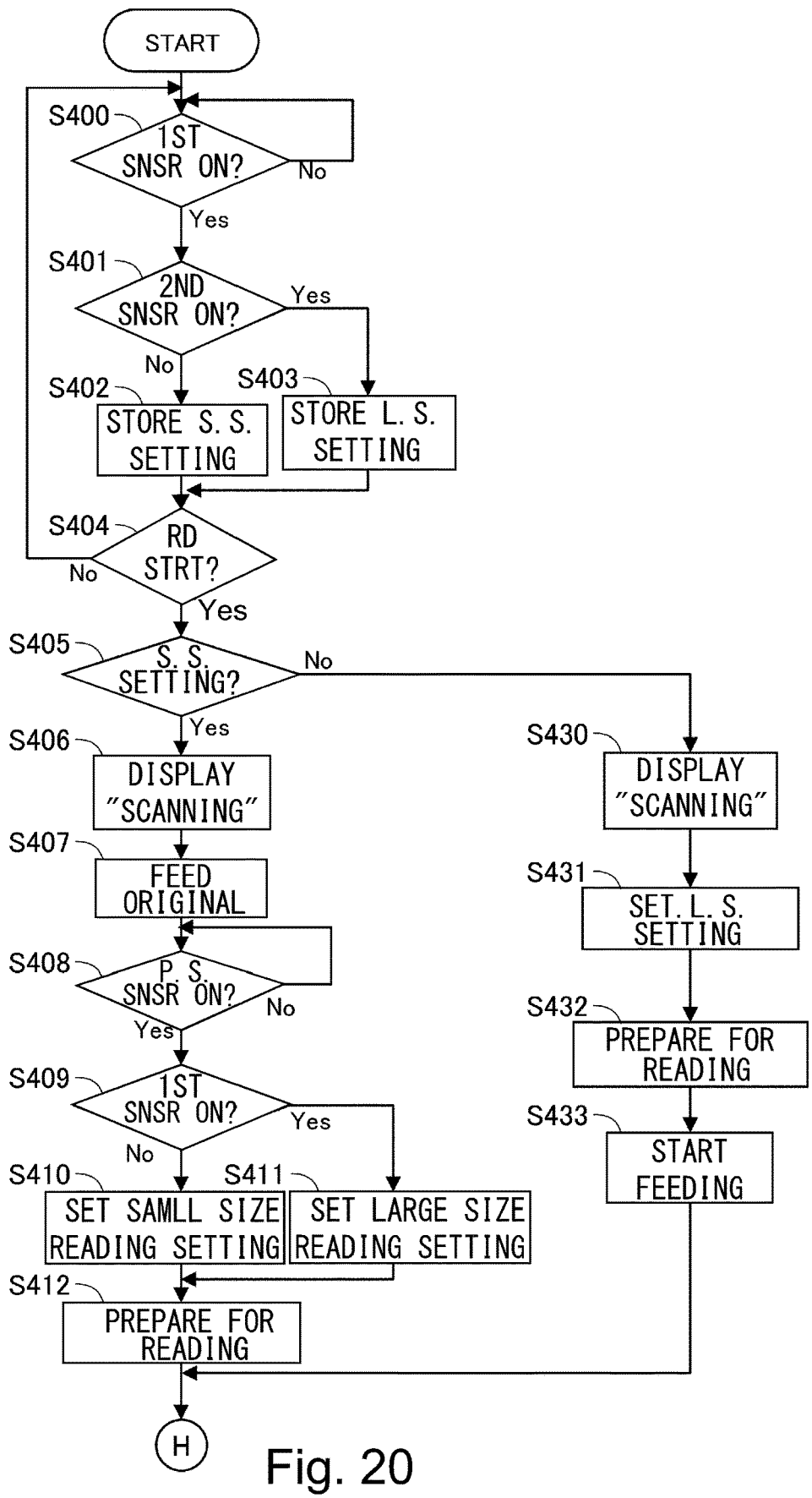

FIG. 20 is a flowchart showing a part of original reading control in a fourth embodiment.

Figure 21:
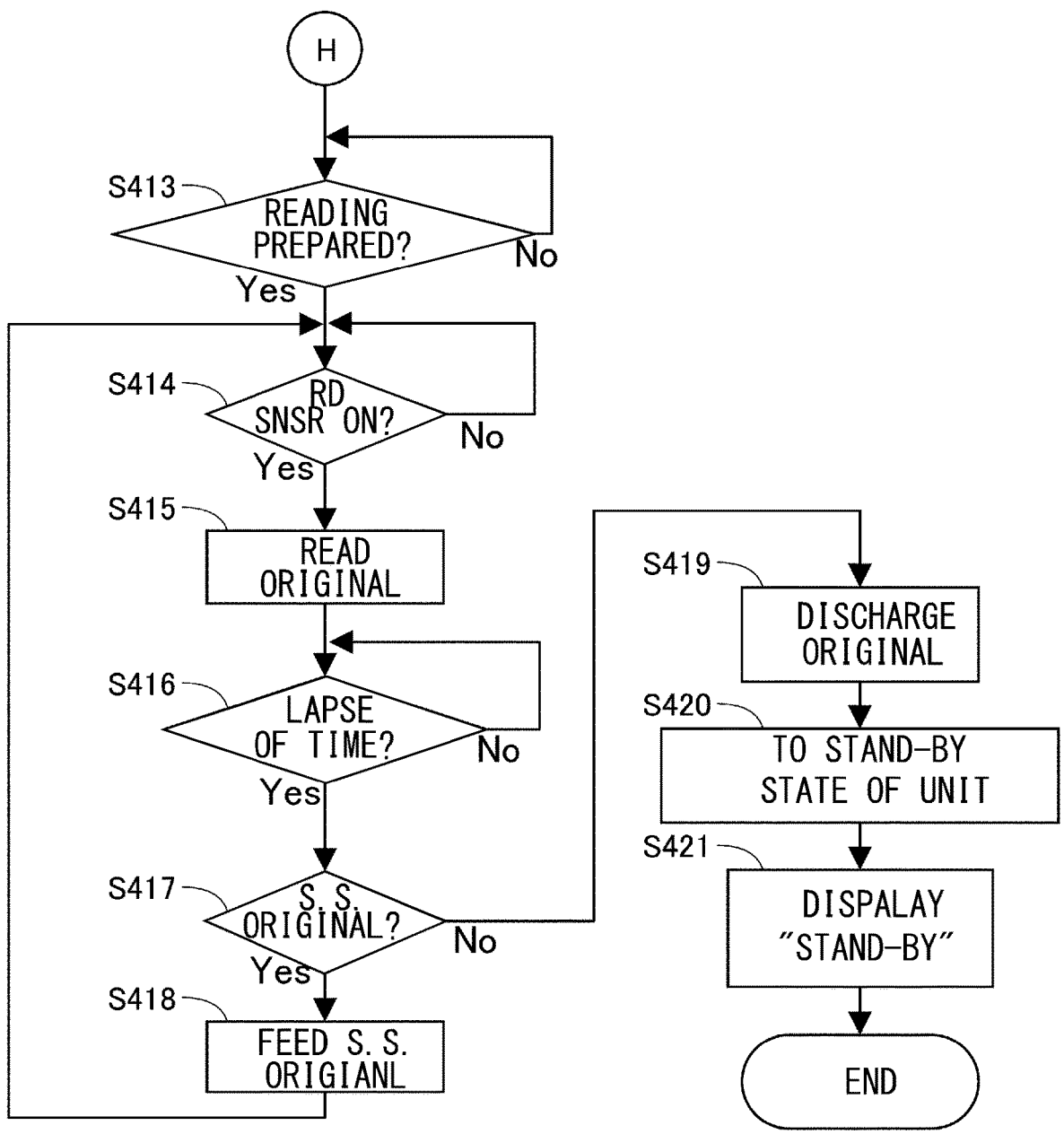

FIG. 21 is a flowchart showing a subsequent part of the original reading control in the fourth embodiment.

DESCRIPTION OF THE EMBODIMENTS

First Embodiment

[General Structure]

Figure 1:
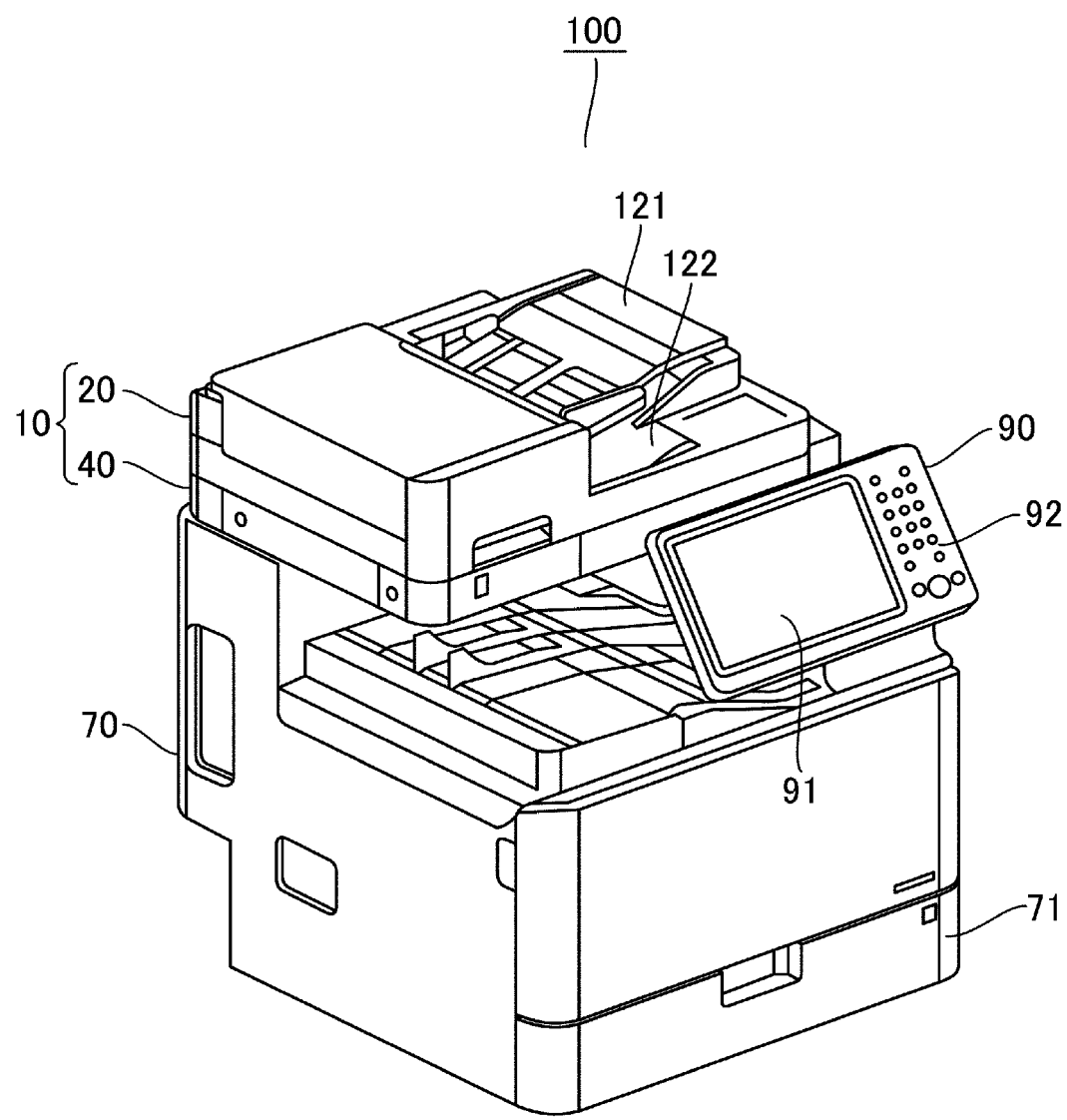
FIG. 1 is a general perspective view of a printer according to an embodiment.

In the following, a first embodiment will be described. A printer 100 as an image forming apparatus according to the first embodiment is a laser beam printer of an electrophotographic type. The printer 100 includes, as shown in FIG. 1, a printer main assembly 70, an original reading device 10 mounted on the printer main assembly 70, and an operating portion 90 including a display portion 91 and operation keys 92 which are used as a notifying means capable of executing various notifications. The printer main assembly 70 includes, as shown in FIG. 1 and parts (a) and (b) of FIG. 2, an image forming engine 60, a controller 80 for controlling the printer 100 and the original reading device 10, and a cassette 71 for accommodating a sheet fed to the image forming engine 60. Incidentally, in the following, the sheet includes, in addition to a plain paper, special paper such as thick paper and coated paper, a recording material having a special shape, such as an envelope and index paper, and a plastic film for an overhead projector and a cloth, and the like, and the original is also an example of the sheet.

The image forming engine 60 as an image forming portion includes, as shown in part (b) of FIG. 2, an image forming unit PU as an image forming means of an electrophotographic type and a fixing device 7. When an instruction to start an image forming operation is provided, a photosensitive drum 1 which is a photosensitive member rotates, and a drum surface thereof is electrically charged by a charging device 2. Then, an exposure device 3 modulates and outputs laser light on the basis of image data sent from an image reading device 30 as an image reading portion or an external computer, and scans the surface of the photosensitive drum 1 with the laser light, so that an electrostatic latent image is formed. This electrostatic latent image is visualized (developed) into a toner image by toner supplied from a developing device 4.

In parallel to such an image forming operation, a feeding operation for feeding, toward the image forming engine 60, a sheet stacked in a cassette 71 or on an unshown manual feeding tray is executed. The fed sheet is conveyed in conformity to progress of the image forming operation performed by the image forming unit PU. Then, the toner image carried on the photosensitive drum 1 is transferred onto the sheet by a transfer roller 5. The toner remaining on the photosensitive drum 1 after toner image transfer is collected by the cleaning device 6. The sheet on which the (unfixed) toner image is transferred is delivered to the fixing device 7 and is heated and pressed by being nipped by a roller pair. The toner is melted and fixed on the sheet, and then the sheet on which the image is fixed is discharged by a discharging means such as a discharging roller pair.

[Original reading device]

Next, an original reading device 10 will be specifically described. The original reading device 10 includes, as shown in part (a) of FIG. 2, an ADF (automatic document feeder) 20 for feeding an original stacked on an original tray 121 as a stacking tray and for discharging the original onto a discharge tray 122, and a reading unit 40 for reading the original fed by the ADF 20. The ADF 20 constitutes an original feeding device for feeding the original to the reading unit 40. The reading unit 40 includes a front surface reading unit 104 for reading an image on a front surface of the original. Further, the original tray 121 constitutes a sheet stacking portion 120 as a sheet stacking means for stacking the original(s), in cooperation with a lower feeding guide 123 of an apparatus (device) main assembly 110 of the ADF 20. Incidentally, this ADF 20 is rotatably supported by the reading unit 40 by unshown hinges so that an original supporting platen glass 101 is openable. Further, the original which is an example of the sheet may be white paper or may also be a sheet on which an image is formed on one surface or both surfaces.

The ADF 20 includes, as the sheet feeding means, a pick-up roller 111 as a rotatable feeding member, and a separation driving roller 112 and a regard roller 113 which constitute a separation roller pair. The ADF 20 further includes, as the sheet feeding means, a registration roller pair 114, a lead roller pair 115, a feeding roller pair 117 and a discharging roller pair 119. Further, the ADF 20 includes, as shown in part (a) of FIG. 2 and FIG. 3, a first original presence/absence detecting sensor 204, a second original presence/absence is detecting sensor 205, a post-separation sensor 207, a lead sensor 210, and the like which are described later. The ADF 20 further includes a feeding motor 224, a feeding clutch 223, a back surface reading unit 212 as an image reading means, and the like. The back surface reading unit 212 includes an LED 214 for irradiating the original with light, a back surface reading glass 217 and a reading sensor 216 for reading an image of the original through a lens array 215. On the other hand, the reading unit 40 includes a platen glass 102, an original supporting platen glass 101, a front surface reading unit 104 as an image reading means, an optical system HP sensor 226, an optical system motor 225, and the like. Further, the front surface reading unit 104 includes an LED 105 for irradiating the original with light, the platen glass 102 (or the original supporting platen glass 101) and a reading sensor 108 for reading an image of the original through a lens array 107. The front surface reading unit 104 is constituted so as to be slidable (movable) by a moving guide 109, i.e., is constituted so as to be movable in a sub-scan direction of the reading sensor 108.

The original tray 121 includes, as shown in FIG. 4, side restricting means 125 which are movable in a widthwise direction on a stacking surface of the original and which are used as a width restricting means for restricting a position of the original with respect to the widthwise direction of the original in contact with end portions of the original with respect to the widthwise direction. The side restricting means 215 is constituted by a pair of side restricting plates 125A and 125B movable in the widthwise direction. These side restricting plates 125A and 125B move in the widthwise direction in an interrelation manner by moving one side restricting plate through, for example, a rack-and-pinion mechanism which is an unshown interrelating mechanism provided inside the original tray 121. In this embodiment, a feeding center of the original is positioned at a center with respect to the widthwise direction, and these side restricting plates 125A and 125B are constituted so as to move toward and away from the center with respect to the widthwise direction, i.e., are constituted so that the original feeding center is in the same position irrespective of an original size.

Further, the original tray 121 is constituted by being supported so as to be rotatable relative to the device main assembly 110 about an unshown rotation shaft provided so as to extend in the widthwise direction. The original tray 121 is rotated upwardly by a user manually relative to the device main assembly 110, so that it becomes possible to easily take out the original, discharged on the discharge tray 122, by the user.

In the ADF 20, the above-described pick-up roller 111 is disposed so as to be swingable by an arm 111a. The arm 111a is lifted and lowered with transmission of a driving force of the feeding motor 224 (FIG. 3) to the pick-up roller 111 through engagement with the feeding clutch 223 (FIG. 3), and brings the pick-up roller 111 into contact with an uppermost original of a bundle of originals. This arm 111a is provided with a locking mechanism for locking a restricting plate 130 as a downstream restricting means contacting a downstream end portion with respect to an original feeding direction (sheet feeding direction) so as to be interrelated therewith. This locking mechanism locks the restricting plate 130 to a position when a leading end position of the original(s) in a state in which the pick-up roller 111 is lifted. Further, the locking mechanism releases the locking of the restricting plate 130 in a state in which the pick-up roller 111 is lowered and this enables passing of the original.

As shown in part (a) of FIG. 2 and FIG. 4, on a side upstream of this restricting plate 130 with respect to the original feeding direction, a detecting member 160 of the first original presence/absence detecting sensor 204 and a detecting member 150 of the second original presence/absence detecting sensor 205 are provided in parallel to each other with respect to the widthwise direction. Further, the detecting member 160 and the detecting member 150 are disposed downstream of a position (original contact portion) where the pick-up roller 111 lowers and contacts the original and upstream of a separation nip with respect to the feeding direction. The first original presence/absence detecting sensor 204 outputs an ON signal when the detecting member 160 is rotated by being pressed downward by the originals. The second original presence/absence detecting sensor 205 outputs an ON signal when the detecting member 150 is rotated by being pressed upward by the originals.

Thus, the first original presence/absence detecting sensor 204 is capable of installing wiring inside the device main assembly 110 by being disposed inside the device main assembly 110, and thus makes installation of the wiring in the original tray 121 unnecessary. The second original presence/absence detecting sensor 205 is also capable of installing wiring inside the device main assembly 110 by being disposed inside the device main assembly 110, and thus makes installation of the wiring in the original tray 121 unnecessary.

Then, a reading operation of the original will be described using part (a) of FIG. 2. The original reading device 10 reads image information from the original by an operation in a skimming-through reading mode in which an image of the original is scanned while feeding the original stacked on the original tray 121 by the ADF 20 and by an operation in a fixed reading mode in which the original placed on the original supporting platen glass 101 is scanned. The skimming-through reading mode is selected in the case where the original stacked on the original tray 121 is detected by the first original presence/absence detecting sensor 204 or in the case where the user explicitly designates the mode through an operating portion 90 or the like.

When the operation in the skimming-through reading mode is executed, the pick-up roller 111 lowers and contacts the uppermost original of the originals on the original tray 121. Then, the originals are fed by the pick-up roller 111 and are separated one by one in a separation nip as a separating means formed by the separation driving roller 112 and the retard roller 113. In a rotation supporting structure of the retard roller 113, a torque limiter is provided, so that the retard roller 113 is rotated together with the separation driving roller 112 when the number of the fed originals is one and is not rotated when the number of the fed originals is two or more. For this reason, the retard roller 113 is capable of separating the originals one by one. Incidentally, to the retard roller 113, drive (driving force) in a direction opposite to the sheet feeding direction may also be inputted. Further, in order to read the original fed simultaneously with the lowering of the pick-up roller 111, the front surface reading unit 104 is moved below the platen glass 102 (feeding guide plate 211).

A leading end and a trailing end of the original passed through the separation nip are detected by the post-separation sensor 207 (FIG. 3) and become bases of lifting/lowering timing and drive start/stop timing of the pick-up roller 111. Incidentally, the pick-up roller 111 and the separation driving roller 112 are connected to the feeding motor 224 which is the same driving source by engagement with the feeding clutch 223 and are driven by the feeding motor 224 (FIG. 3).

The original to be fed is fed toward the platen glass 102 by the registration roller pair 114 and the lead roller pair 115. The feeding guide plate 211 is disposed opposed to the platen glass 102. The feeding guide plate 211 guides the original passing through the platen glass 102 so as not to float from the platen glass 102. Incidentally, the registration roller pair 114 and the lead roller pair 115 are connected to the feeding motor 224 (FIG. 3) and are driven by the feeding motor 224.

In the case of front surface reading, a front surface image of the original is read by the front surface reading unit 104 through the platen glass 102. A reading surface of the original is irradiated with light by the LED 105 which is an optical source for the front surface reading unit 104, and reflected light from the original surface is photoelectrically converted line by line by a light-receiving element of the reading sensor 108 through the lens array 107. The image information photoelectrically converted is transferred to an image memory (A) 305 (FIG. 3) of a controller 80. Then, the original passed through the platen glass 102 is guided to the feeding roller pair 117 and is discharged onto the discharge tray 122 by the discharging roller pair 119. Incidentally, the feeding roller pair 117 and the discharging roller pair 119 are also connected to the feeding motor 224 (FIG. 3) and are driven by the feeding motor 224.

In the case of double-surface (side) reading, the front surface is read by the front surface reading unit 104 as described above, and a back surface image of the original is read by the back surface reading unit 212. A reading surface is irradiated with light by the LED 214 which is a light source for the back surface reading unit 212, and reflected light from the original surface is photoelectrically converted line by line by a light-receiving element of the reading sensor 216 through the lens array 215. The image information photoelectrically converted is transferred to the image memory (A) 305 (FIG. 3) of the controller 80.

On the other hand, the fixed reading mode is selected in the case where the image reading device detects the original placed on the original supporting platen glass 101 or in the case where the user explicitly designates the fixed reading mode through the operating portion 90. In these cases, the original on the original supporting platen glass 101 is not moved, and the front surface reading unit 104 is moved along the original supporting platen glass 101 by driving the optical system motor 225, so that the original is scanned. Similarly, the image information photoelectrically converted by the light-receiving element of the reading sensor 108 of the front surface reading unit 104 is transferred to the image memory (A) 305 (FIG. 3) of the controller 80.

[Controller]

Then, a control system in the printer 100 will be specifically described. FIG. 3 includes a block diagram of the original reading device 10 showing an electrical connection relationship between portions of the ADF 20 and portions of the reading unit 40 and a block diagram of the printer 100 for carrying out control of entirety of the printer 100 including the operating portion 90. Of these, a controller 80 as a control means in the first embodiment is constituted by a reading unit controller 300 in the reading unit 40 and a printer controller 310 in the printer 100. In this embodiment, the controller 80 as the control means is described as a controller in which the reading unit controller 300 and the printer controller 310 are separated from each other, but these controllers may also be combined into a single controller or may also be further divided into a plurality of controllers.

First, the detecting unit controller 300 will be described. A CPU (A) 301 is a central processing unit for carrying out integrated control of the respective portions of the reading unit 40 and the ADF 20. An ROM (A) 302 is a storing device in which control contents to be executed by the CPU (A) 301 are stored as programs. An RAM (A) 303 is a storing device used as a working (operational) area necessary to carry out the control by the CPU (A) 301.

To the CPU (A) 301, the feeding motor 224 for driving the respective rollers for the feeding are connected. The feeding motor 224 is connected to the pick-up roller 111 and the separation driving roller 112 through the feeding clutch 223. By disconnecting the feeding clutch 223, the feeding of the original can be stopped at a position P (stop position P) in front of the registration roller pair 114 in FIG. 2.

Further, to the CPU (A) 301, the first original presence/absence detecting sensor 204 and the second original presence/absence detecting sensor 205 which are used for detecting the original(s) stacked on the original tray 121, the post-separation sensor 207 for detecting an original end portion on a sheet feeding passage, and the lead sensor 210 for detecting the original end portion are connected. In this embodiment, the feeding motor 224 is a pulse motor, and the CPU (A) 301 manages a pulse of the feeding motor 224 by controlling the number of driving pulses. The number of the driving pulses can be grasped as a feeding distance of the original, and the CPU (A) 301 carries out the feeding of the original by controlling respective loads and the like on the basis of the feeding distance calculated from the pulse.

To the CPU (A) 301, in order to realize an image reading function, the optical system motor 225, the optical system HP sensor 226, an image memory (A) 305, an image process or (A) 306, and an image transfer portion (A) 304 are connected. The front surface reading unit 104 is provided with the LED 105 which is a light source and the reading sensor 108 which is a line sensor. The fed original is irradiated with light at the front surface thereof by the LED 105, and the light with which the original is irradiated is photoelectrically converted line by line by the light receiving element of the reading sensor 108 and is read as image data. The back surface reading unit 212 is provided with an LED 214 which is a light source and a reading sensor 216 which is a line sensor. The fed original is irradiated, similarly as in the case of the front surface, with light at the back surface thereof by the LED 214, and the light is photoelectrically converted line by line by the light receiving element of the reading sensor 216 and is read as image data. The image memory (A) 305 is a storing device for temporarily store the image data read by the front surface reading unit 104 and the back surface reading unit 212. Incidentally, the front surface reading unit 104 is moved so as to oppose a reference plate 103 by the optical system motor 225, and at the moved position, the reference plate 103 is read by the reading sensor 108 while irradiating the reference plate 103 with light by the LED 105, so that a preparatory operation such as shading (density control) or the like can be performed.

The image process or (A) 306 corrects a reading image stored in the image memory (A) 305 by image processing. The image transfer portion (A) 304 transfers the image data, subjected to the image processing by the image process or (A) 306, to an image transfer portion (B) 314 of the printer controller 310 described later through an image transfer line 402.

Next, the printer controller 310 will be described. The printer controller 310 controls entirety of an image reading system including the reading unit 40 and the ADF 20. A CPU (B) 311 is a central processing unit for carrying out integrated control of portions of the printer controller 310. A ROM (B) 312 is a storing device in which control contents to be executed by the CPU (B) 311 are stored as programs. An RAM (B) 313 is a storing device used as a working area necessary to carry out control by the CPU (B) 311.

The image transfer portion (B) 314 receives the image (data) from the image transfer portion (A) 304, and the image (data) is stored in the image memory (B) 315. The operating portion 90 is capable of performing an operation instruction from a user to an entire image reading system, display of messages to the user and display of the read images, and performs desired display and reception of input through communication between itself and the CPU (B) 311.

The CPU (B) 311 transfers control commands relating to image reading control and data for control, through the communication line 401 with the CPU (A) 301. For example, the CPU (B) 311 receives an image reading start instruction from the user through the operating portion 90 and sends an image reading start request to the CPU (A) 301. For example, the CPU (B) 311 receives pieces of reading information such as instructions of monochromatic reading and color reading, reading resolution, the reading start instruction through operation keys 92 of the operating portion 90 and sends the pieces of the read information to the CPU (A) 301. Further, the CPU (B) 311 receives a state of the original reading device 10 from the CPU (A) 301 and causes the operating portion 90 to the display a message to the user, depending on the state of the original reading device 10.

[Positional Relationship Between First Original Presence/absence Detecting Sensor and Second Original Presence/absence Detecting Sensor]

Then, a positional relationship between a first detecting position P1 of the first original presence/absence detecting sensor 204 as a first detecting sensor and a second detecting position P2 of the second original presence/absence detecting sensor 205 as a second detecting sensor will be described. FIG. 5 is a top plan view showing the ADF in a state in which an original with a small size is set. In this embodiment, the original with the small size refers to a sheet short in width, such as a business card. For example, a size of the business card used in Japan is 55 mm×91 mm, and a size of the business card used in United States of America is 51 mm×89 mm, 49 mm×85 mm or the like. As shown in FIG. 5, for example, an original S1 with a small size (second size) small in width such as the business card is stacked on the original tray 121, and a position thereof with respect to a widthwise direction is restricted by the side restricting plates 125A and 125B so that opposite ends of the original S1 with respect to the widthwise direction contact the side restricting plates 125A and 125B. Then, the original S1 is set in a first range W1 with respect to the widthwise direction. The detecting member 160 of the first original presence/absence detecting sensor 204 is disposed at the first detecting position P1 (position closer to a center than an end portion with respect to the widthwise direction is) which is a central portion with respect to the widthwise direction, i.e., is disposed within the first range W1. For that reason, when the original S1 is inserted toward a downstream side of the feeding direction and is set so as to contact the restricting plate 130 (FIG. 4), the detecting member 160 is pressed downward and is rotated. By this, the first original presence/absence detecting sensor 204 outputs an ON signal, so that presence of the original S1 is discriminated (detected).

On the other hand, as shown in FIG. 6, for example, an original S2 with a large size (first size) small in width such as an A4 size is stacked on the original tray 121, and a position thereof with respect to a widthwise direction is restricted by the side restricting plates 125A and 125B so that opposite ends of the original S2 with respect to the widthwise direction contact the side restricting plates 125A and 125B. Then, the original S2 is set in a second range W2 with respect to the widthwise direction. As described above, the detecting member 160 of the first original presence/absence detecting sensor 204 is disposed at the first detecting position P1 which is a central portion (central side) with respect to the widthwise direction. The detecting member 150 of the second original presence/absence detecting sensor 205 is disposed at the second detecting position P2 (position closer to the end portion than the center with respect to the widthwise direction is) which is on the end portion side than on the central portion side with respect to the widthwise direction, i.e., is disposed within the second range W2 which is an outside range of the first range W1. For that reason, when the original S2 is inserted toward a downstream side of the feeding direction and is set so as to contact the restricting plate 130 (FIG. 4), the detecting member 160 is pressed downward and is rotated, and the detecting member 150 is pressed upward and is rotated. By this, both the first original presence/absence detecting sensor 204 and the second original presence/absence detecting sensor 205 output ON signals, so that presence of the original S2 is discriminated (detected).

Accordingly, as shown in FIG. 5, in the case where the first original presence/absence detecting sensor 204 outputs the ON signal and the second original presence/absence detecting sensor 205 outputs an OFF signal, the controller 80 can discriminate that the original has the small size. Further, as shown in FIG. 6, in the case where both the first original presence/absence detecting sensor 204 and the second original presence/absence detecting sensor 205 output the ON signals, the controller 80 can discriminate that the original has the large size.

However, as shown in FIG. 7, for example, although the original S2 with the large size such as the A4 size is stacked on the original tray 121, the original S2 is obliquely stacked in some instances. Then, although the first original presence/absence detecting sensor 204 outputs the ON signal, the second original presence/absence detecting sensor 205 outputs the OFF signal, so that the controller 80 discriminates that the original S2 has the small size in some instances although the original S2 with the large size is stacked. Incidentally, such a case is not limited to the case where the original S2 is obliquely stacked, but there is a possibility that the controller 80 discriminates that the original S2 has the small size also in the case where the original S2 causes a crease or breakage. Further, also in the case where the first original presence/absence detecting sensor 204 is disposed on a side upstream of the second original presence/absence detecting sensor 205 with respect to the feeding direction, there is a liability that the controller 80 discriminates that the original S2 has the small size when the original S2 is stacked shallowly. Due to these causes, even when the user intends to cause the controller 80 to properly select and execute feeding control, there is a possibility that the proper feeding control cannot be executed. Therefore, original reading control described below is carried out.

[Original Reading Control in First Embodiment]

Then, original reading control in the first embodiment will be described using FIGS. 8 to 13. A flowchart of FIG. 8 shows control carried out by executing a program, stored in the ROM (A) 302, by the CPU (A) 301 when the one-side reading of the original is carried out using the ADF 20. Each of FIGS. 9 to 13 is an example of a screen displayed on the display portion 91 of the operating portion 90 in accordance with a state of the original reading device 10.

As shown in FIG. 8, when the controller 80 starts the original reading control, first, the user sets the original on the original tray 121 and the original reading device 10 is on stand-by until the first original presence/absence detecting sensor 204 is turned on (No of S101). When the controller 80 detects that the first original presence/absence detecting sensor 204 is turned on (Yes of S101), the controller 80 discriminates that the original is set, and then discriminates whether or not the second original presence/absence detecting sensor 205 is turned on (S102). That is, as described above, unless the second original presence/absence detecting sensor 205 is turned on, the controller 80 discriminates that the set original has the small size (No of S102), and when the second original presence/absence detecting sensor 205 is turned on, the controller 80 discriminates that the set original has the large size (Yes of S102). In the case where the size of the original is discriminated as the small size, reading setting for the small size is stored as reading setting in the RAM (A) 303 (S103). In the case where the size of the original is discriminated as the large size, reading setting for the large size is stored as reading setting in the RAM (A) 303 (S104). These reading settings are set values, used in the image (process or (A) 306, such as light quantity setting of the LED 105 as the light source, reading color setting for color or white/black in the reading sensor 108, and one-line cyclic period setting.

Then, the controller 80 waits until the user provides an instruction to start a reading operation through the operation keys 92 in the operating portion 90, i.e., until the user performs a reading start operation (No of S105). In a period until the reading start operation is performed, detection (monitoring) of the first original presence/absence detecting sensor 204 and the second original presence/absence detecting sensor 205 is continued, and every change in sensor input, the reading setting for the small size or the reading setting for the large size which are stored in the RAM (A) 303 is renewed. Further, in this state, as a screen of the display portion 91, a "stand-by screen" as shown in FIG. 9 is displayed.

When the reading start operation is received (Yes of S105), the screen of the display portion 91 is switched to a "scanning screen" as shown in FIG. 10 (S106). Then, a set value of the reading setting stored in the RAM (A) 303 is set in the image processor (A) 306 (S107). Thereafter, a reading preparation of the front surface reading unit 104 is started (S108). This reading preparation is turning-on of the LED 105, actuation of the reading sensor 108 (CIS drive), shading, and movement of the front surface reading unit 104 to the platen glass 102. Further, when the reading preparation is started, the pick-up roller 111 is lowered, and the feeding of the original is started (S109).

Then, the controller 80 discriminates whether the reading setting stored in the RAM (A) 303 is the reading setting for the small size or the reading setting for the large size (S110). In the case where the reading setting for the large size is stored (No of S110), the process goes to a step S111. Thereafter, depending on the reading setting for the large size, the respective roller pairs (sheet feeding means) and the front surface reading unit 104 (image reading means) are operated in a first reading made in which these means are controlled by an image reading operation for the large size. In this embodiment, in the operation in the first reading mode, the feeding speed is set at 340 mm/sec as a first feeding speed, and a sheet (paper) interval is set at 30 mm. In the operation in the first reading mode, the feeding is continued until the lead sensor 210 is turned on (No of S111), and when the lead sensor 210 is turned on (Yes of S111), reading of the original is started by the front surface reading unit 104 (S112). Thereafter, during the reading of the original, the original reading device 10 waits for a time (subsequent original feeding start time) until feeding of a subsequent original is started (No of S113). As this subsequent original feeding start time, a time from the turning-on of the lead sensor 210 for the current original and which takes the sheet interval into consideration is set. For example, when the A4-size original (297 mm), the feeding speed of 340 mm/sec and the sheet interval of 30 mm are set, as the subsequent original feeding start time T, T=((297+30)/340) (sec) is set.

When the subsequent original feeding start time has elapsed (Yes of S113), the controller 80 discriminates whether or not the original is still present on the original tray 121 (S114). In the case where the original is present on the original tray 121 (Yes of S114), the process returns to the step S109, and the feeding and the reading of the original shown in the steps S109 to S114 are repetitively carried out. In the step S114, in the case where the controller 80 discriminated that the original is absent on the original tray 121 (No of S114), the original in the original reading device 10 is discharged onto the discharge tray 122 (S115). Thereafter, the front surface reading unit 104 is caused to go to the stand-by state (S116). In this stand-by state, the LED 105 is turned off, the reading sensor is deactivated (CIS stop), and the front surface reading unit 104 is moved to a stand-by position (home position). Then, the screen of the display portion 91 is switched to a "stand-by screen" as shown in FIG. 9, so that the original reading process is ended (S117).

On the other hand, in the step S110, in the case where the reading setting for the small size is stored in the RAM (A) 303 (Yes of S110), the original feeding is started and then detection as the whether or not the second original presence/absence detecting sensor 205 is turned on is monitored (S120). In the case where the turning-on of the second original presence/absence detecting sensor 205 is not detected (No of S120), the original reading device 10 is on stand-by in a state whether or not the turning-on of the post-separation sensor 207 is detected is monitored (No of S121). In the case where the turning-on of the second original presence/absence detecting sensor 205 is not detected but the turning-on of the post-separation sensor 207 is detected (Yes of S121), it becomes definite that the original has the small size, so that the feeding is continued as it is, and the feeding of the original and the reading control in the above-described step S111 and later are carried out. That is, thereafter, depending on the reading setting for the small size, the respective roller pairs (sheet feeding means) and the front surface reading unit 104 (image reading means) and carried out in the operation in a second reading mode in which these means are controlled by an image reading operation depending on the small size. In the operation in the second reading mode, the feeding speed is set at 196.9 mm/sec which is a second feeding speed slower than the first feeding speed.

On the other hand, in the case where before the turning-on of the post-separation sensor 207 is detected (No of S121), the turning-on of the second original presence/absence detecting sensor 205 is detected (Yes of S120), a stop process for stopping the feeding of the original is executed (S122). In the case where the feeding of the original is stopped, a state in which although the size of the original is discriminated as the small size before the feeding of the original is started and the reading process is started in the reading setting for the small size, the size of the original is discriminated as the large size after the feeding of the original is started is formed. For this reason, it is doubtful that the original was obliquely stacked on the original tray 121, and therefore, on the display portion 91, a screen in which the user is notified of a message of "re-setting of original" (notification prompting the user to stack the sheet again on the original tray 121) as shown in FIG. 11 is displayed (S123). Thereafter, the original reading device 10 is on stand-by until both the first original presence/absence detecting sensor 204 and the second original presence/absence detecting sensor 205 are turned off, i.e., is once on stand-by for removal of the original from the original tray 121 (No of S124). In the case where the turning-off of both the first original presence/absence detecting sensor 204 and the second original presence/absence detecting sensor 205 is detected (Yes of S124), on the display portion 91, a screen in which the user is notified of a message of "return original to first sheet" as shown in FIG. 12 is displayed (S125). Then, the process returns again to the step S101 and the original reading device 10 is on stand-by until the first original presence/absence detecting sensor 204 is turned on, i.e., until the original is set again. Thereafter, similarly, the above-described original reading control is carried out.

Incidentally, after the user is notified of that the original is returned to the first sheet, the front surface reading unit 104 is on stand-by for re-setting of the original with the large size. In this case, until the first original presence/absence detecting sensor 204 and the second original presence/absence detecting sensor 205 are turned on, as shown in FIG. 13, a message notifying the user of that the re-setting of the original is not properly made (i.e., is in an improper state may also be displayed on the display portion 91).

As described above, in the case where the size of the original is discriminated as the small size before the original feeding is started and thereafter the original feeding is started and the size of the original is discriminated as the large size, the original feeding is stopped and the message prompting the user to re-set the original onto the original tray 121 is displayed on the display portion 91. By this, setting of the original onto the original tray 121 at a proper position by the user is enabled, and a correct original size can be discriminated. For this reason, it is possible to prevent that proper control (feeding control, image reading control) cannot be carried out, so that the feeding of the sheet depending on the original size and the original reading operation in proper reading setting can be performed.

Second Embodiment

Then, a second embodiment in which the above-described first embodiment is partially changed will be described using FIGS. 14 to 17. First, a problem caused in the case a corner of a free end portion of the original is folded will be described using FIG. 14. As shown in FIG. 14, in the case where an original S3 of which corner of a free end portion is folded is set so that opposite ends of the original S3 with respect to the widthwise direction are contacted to the side restricting plates 125A and the 125B, the original S3 is set without being inclined. However, the detecting member 160 of the first original presence/absence detecting sensor 204 is pressed, but the detecting member 150 of the second original presence/absence detecting sensor 205 is not pressed upward. For this reason, a state in which the first original presence/absence detecting sensor 204 is turned on and the second original presence/absence detecting sensor 205 is turned off is formed, so that there arises a problem such that the reading setting for the small size is selected, i.e., that proper control cannot be carried out. Therefore, in the original reading control in the second embodiment, also when the original S3 of which corner of the free end portion is fed, it becomes possible to execute the proper control.

Incidentally, in the description of the second embodiment, portions similar to those in the first embodiment will be briefly described or omitted from description. Constitutions of the printer 100 and the original reading device 10 in this embodiment are similar to those in the first embodiment, and particularly, the positional relationship between the first original presence/absence detecting sensor 204 and the second original presence/absence detecting sensor 205 is also similar to that in the first embodiment.

[Original Reading Control in Second Embodiment]

In the second embodiment, first, with a size discriminated before feeding of the original is started, reading setting is started before the original feeding is started. The start of the reading setting is synonymous with preparation of an image reading operation by the front surface reading unit 104. Accordingly, an operation in a first preparation mode in which the reading setting is carried out before the original feeding is started. On the other hand, similarly as in the above-described embodiment 1, in the case where the size of the original is discriminated as the small size before the original feeding is started and is discriminated as the large size after the original feeding is started, the controller 80 performs the stop process and causes the display portion 91 to display a message prompting the user to set the original again on the original tray 121. Then, in this second embodiment, in the case where the subsequent stop process is executed, after the original feeding is started, the size of the original is discriminated and finalized and then the reading setting for the small size or the reading setting for the large size is carried out. Accordingly, in the case where the stop process is executed, an operation in a second preparation mode in which reading setting is carried out after the original feeding is started.

Specifically, as shown in FIG. 15, first, in steps S201 and S204, control similar to the control in the steps S101 to S104 in the first embodiment is executed. That is, the user sets the original on the original tray 121 (S201, S202) and then carries out a process of storing the reading setting for the small size or the reading setting for the large size in the RAM (A) 303 (i.e., executes the operation in the first preparation mode (S203, S204). Then, in a step S205, a discrimination flag used in a later process is turned on which an initial state and is stored in the RAM (A) 303.

In steps S206 to S210, control similar to the control in the steps S105 to S109 is executed. That is, the original reading device 10 is on stand-by for a start operation of a reading operation by the user (No of S206), and in a period thereof, the detection by the first original presence/absence detecting sensor 204 and the second original presence/absence detecting sensor 205 are continued, and when sensor input is changed, the reading setting for the small size or the reading setting for the large size is renewed. Thereafter, when the controller 80 receives the start operation of the reading operation (Yes of S206), the controller 80 causes the display portion 91 to display the scanning screen (FIG. 10) (S207) and sets the reading setting stored in the RAM (A) 303, in the image processor (A) 306 (S208). Further, when the reading preparation of the front surface reading unit 104 is started (S209), the pick-up roller 111 is lowered, and the feeding of the original is started (S210).

Then, the controller 80 discriminates whether or not the discrimination flag stored in the RAM (A) 303 turned on and the reading setting is the reading setting for the small size (S211). That is, the case where the discrimination flag is turned off or the reading setting for the large size is stored (No of S211), the process goes to steps S212 to S218. Thereafter, depending on the reading setting for the large size, the respective roller pairs (sheet feeding means) and the front surface reading unit 104 (image reading means) are operated in a first reading made in which these means are controlled by an image reading operation for the large size. That is, control similar to the control in the steps S111 to S117 in the embodiment 1 is carried out.

That is the feeding is continued until the lead sensor 210 is turned on (No of S212), and when the lead sensor 210 is turned on (Yes of S212), reading of the original is started by the front surface reading unit 104 (S213). Thereafter, the original reading device 10 waits for a subsequent original feeding start time (which is a time similar to that in the embodiment 1) (No of S214), and when the subsequent original feeding start time has elapsed (Yes of S214), the controller 80 discriminates whether or not the original is still present on the original tray 121 (S215). In the case where the original is present on the original tray 121 (Yes of S215), the process returns to the step S210, and the feeding and the reading of the original are repetitively carried out with the step S215. In the step S215, when the controller 80 discriminated that the original is absent on the original tray 121 (No of S215), the original in the original reading device 10 is discharged onto the discharge tray 122 (S216). Thereafter, the front surface reading unit 104 is caused to go to the stand-by state (S217), and the screen of the display portion 91 is switched to a stand-by screen (FIG. 9) (S218), so that the original reading process is ended.

On the other hand, in the step S211, in the case where the turning on of the discrimination flag and the reading setting for the small size are stored in the RAM (A) 303 (Yes of S211), the process goes to the step 220 shown in FIG. 16. That is, after the original feeding is started, whether or not the second original presence/absence detecting sensor 205 is turned on is discriminated (S220). In the case where the turning-on of the second original presence/absence detecting sensor 205 is not detected (No of S220), whether or not the turning-on of the post-separation sensor 207 is detected is discriminated (S221). In the case where the turning-on of the second original presence/absence detecting sensor 205 is not detected but the turning-on of the post-separation sensor 207 is detected (Yes of S221), it becomes definite that the original has the small size. For that reason, the feeding is continued as it is, and the process goes to the step S212 of FIG. 15 and thereafter the feeding of the original and the reading control are carried out similarly as described above. That is, thereafter, depending on the reading setting for the small size, the respective roller pairs (sheet feeding means) and the front surface reading unit 104 (image reading means) and carried out in the operation in a second reading mode in which these means are controlled by an image reading operation depending on the small size.

In the step S220 of FIG. 16 described above, in the case where before the turning-on of the post-separation sensor 207 is detected (No of S221), the turning-on of the second original presence/absence detecting sensor 205 is detected (Yes of S220), the feeding of the original is stopped (S222). The case where the feeding of the original is stopped, is the case where although the size of the original is discriminated as the small size before the feeding of the original is started and the reading process is started in the reading setting for the small size, the original is discriminated as the original with the large size after the feeding of the original is started. In this case, it is doubtful that the original was obliquely stacked on the original tray 121 and that the original of which corner of the free end portion is folded is stacked on the original tray 121, and therefore, on the display portion 91, a message of "re-setting of original" shown in FIG. 11 is displayed on a screen, so that the user is prompted to perform the re-setting (S223). Thereafter, the original reading device 10 is on stand-by until the turning-off of both the first original presence/absence detecting sensor 204 and the second original presence/absence detecting sensor 205 is detected, i.e., is once on stand-by for removal of the original from the original tray 121 (No of S224). In the case where the turning-off of both the first original presence/absence detecting sensor 204 and the second original presence/absence detecting sensor 205 is detected (Yes of S224), on the display portion 91, a message of "return original to first sheet" shown in FIG. 12 is displayed (S225). That is, the user is notified of that the user is prompted to return the original to the first sheet. Then, the process goes to an original re-setting process (S226).

When the original re-setting process is started, as shown in FIG. 17, first, the original reading device 10 is on stand-by until turning-on of the first original presence/absence detecting sensor 204 is detected (No of S250), i.e., until the original is set again. When the turning-on of the first original presence/absence detecting sensor 204 is detected (Yes of S250), the original reading device 10 is on stand-by for reception of a start operation in which the user provides an instruction to start the reading operation through the operation keys 92 at the operating portion 90 (No of S251). In a period in which there is no reception of the reading start, the original reading device 10 is on stand-by for the re-setting of the original and the reading start instruction.

When the reading start instruction is received (Yes of S251), the screen of the display portion 91 is switched to the "scanning screen" shown in FIG. 10 (S252). Further, in this embodiment, without performing preparation of the front surface reading unit 104, the pick-up roller 111 is lowered and the original feeding is started (S253). Then, the original feeding is continued until the post-separation sensor 207 is turned on (No of S254). When the post-separation sensor 207 is turned on (Yes of S254), the controller 80 discriminates whether or not the second original presence/absence detecting sensor 205 is turned on (S255). In the case where the second original presence/absence detecting sensor 205 is turned off (No of S255), the reading setting for the small size is set in the image processor (A) 306 (i.e., the operation in the second preparation mode is carried out) (S256). In the case where the second original presence/absence detecting sensor 205 is turned on (Yes of S255), the reading setting for the large size is set in the image processor (A) 306 (i.e., the operation in the second preparation mode is carried out) (S257). Then, the turning-off of the discrimination flag is stored in the RAM (A) 303 (S258), and the reading preparation of the front surface reading unit 104 is carried out (S259). The reading setting, the reading preparation, and the discrimination flag are the same as the above-described contents thereof. Thus, the original re-setting process (the step S226 shown in FIG. 16) shown in FIG. 17 is ended.

When the original re-setting process (S226) shown in FIG. 16 is ended, the process returns to the step S212 shown in FIG. 15, the processes of the subsequent steps S212 to S218 are performed similarly as described above. However, when the original re-setting process is ended, the turning-off of the discrimination flag is set. For that reason, as regards originals which are a second sheet and subsequent sheets after the original re-setting process, in the step S211, discrimination that the discrimination flag is not turned on is made (No of S211), detection of the original size after the original feeding is started is not made. That is, after the original re-setting process is executed, an operation in the first reading mode in which in accordance with the reading setting for the large size, control of the respective roller pairs (sheet feeding means) and the front surface reading unit 104 (image reading means) is carried out by the image reading operation depending on the large size is performed.

As described above, in the second embodiment, in the original re-setting process performed when the original is set again, the reading preparation is carried out depending on the original size detected after the original feeding is started. For this reason, for example, even when the original S3 of which corner of the free end portion is folded is set, the original size is properly discriminated in the original re-setting process, and thus proper control can be carried out, so that the original can be read properly.

Third Embodiment

Then, a third embodiment in which the above-described first embodiment is partially changed will be described using FIGS. 18 and 19.

Depending on an operation by the user, the case where when the original is set again, the re-setting is made without contact of opposite ends of the original with respect to the widthwise direction with the side restricting plates 125A and 125B would be considered. In this case, although the original with the large size is set by the re-setting, there is a possibility that the reading setting for the small size is selected. Therefore, in the third embodiment, even after the re-setting, in the case where the size of the original is discriminated as the small size before the original feeding is started but is detected as the large size after the original feeding is started, proper control is enabled.

Incidentally, also in the description of the third embodiment, portions similar to those in the first embodiment will be briefly described or omitted from description. Constitutions of the printer 100 and the original reading device 10 in this embodiment are similar to those in the first embodiment, and particularly, the positional relationship between the first original presence/absence detecting sensor 204 and the second original presence/absence detecting sensor 205 is also similar to that in the first embodiment.

[Original Reading Control in the Third Embodiment]

In original reading control in the third embodiment, the number of times that the stop process is executed is counted and an upper limit of the number of times that the stop process is executed is provided, and in the case where the number of times exceeds the upper limit, control of reading the original in the reading setting for the large size is carried out.

Specifically, as shown in FIG. 18, the number of times of continuous stops of 0 and the turning-on of the discrimination flag are set in the RAM (A) 303 (S300). Here, the number of times of continuous stops is the number of times counted by a counter for counting the number of times that the continuous stop process each in which the original feeding is stopped after the original size is discriminated as the small size before the start of the original feeding and then is detected as the large size after the start of the original feeding was carried out. Further, as regards the discrimination flag in the third embodiment, the reading setting for the large size is always selected irrespective of a state of the second original presence/absence detecting sensor 205 on the original tray 121 when the discrimination flag is in an on state. Then, when the discrimination flag is in an off state, depending on turning-on and turning-off of the second original presence/absence detecting sensor 205, the reading setting for the large size and the reading setting for the small size are switched to each other. Incidentally, the number of times of continuous stops is synonymous with, as the number of executions of the stop process, "the number of times that the original size is discriminated as the small size before the start of the original feeding and then is detected as the large size after the start of the original feeding" or "the number of times that the original is set again on the stacking tray".

As described above, when the number of times of continuous stops is set at 0 and the discrimination flag is set at "ON" (S300), the original reading device 10 is on stand-by until the first original presence/absence detecting sensor 204 is turned on, i.e., until the user sets the original on the original tray 214 (No of S301). When the turning-on of the first original presence/absence detecting sensor 204 is detected (Yes of S301), the controller 80 discriminates whether or not the discrimination flag stored in the RAM (A) 303 is turned on (S302). In the case where the discrimination flag is turned on (Yes of S302), the controller 80 discriminates whether or not the second original presence/absence detecting sensor 205 is turned on, i.e., whether the size of the set original is the large size or the small size (S303). In the case where the second original presence/absence detecting sensor 205 is turned on (Yes of S303), the original size is discriminated as the large size, and the reading setting for the large size is stored in the RAM (A) 303 (S305). On the other hand, in the case where the second original presence/absence detecting sensor 205 is turned off (No of S303), the original size is discriminated as the small size, and the reading setting for the small size is stored in the RAM (A) 303 (S304).

Then, the original reading device 10 is on stand-by for the start operation of the reading operation by the user (No of S306). In this period in this embodiment, the discrimination flag is turned on and therefore, the detection by the first original presence/absence detecting sensor 204 and the second original presence/absence detecting sensor 205 are continued, and when sensor input is changed, the reading setting for the small size or the reading setting for the large size is renewed.

When the controller 80 receives the start operation of the reading operation (Yes of S306), the controller 80 causes the display portion 91 to display the scanning screen (FIG. 10) (S307) and sets the reading setting stored in the RAM (A) 303, in the image processor (A) 306 (S308). Further, when the reading preparation of the front surface reading unit 104 is started (S309), the pick-up roller 111 is lowered, and the feeding of the original is started (S310).

Then, the controller 80 discriminates whether or not the reading setting is the reading setting for the small size (S311). That is, the case where the reading setting for the large size is stored (No of S311), the process goes to steps S312 to S318. Thereafter, depending on the reading setting for the large size, the respective roller pairs (sheet feeding means) and the front surface reading unit 104 (image reading means) are operated in a first reading made in which these means are controlled by an image reading operation for the large size.

That is the feeding is continued until the lead sensor 210 is turned on (No of S312), and when the lead sensor 210 is turned on (Yes of S312), reading of the original is started by the front surface reading unit 104 (S313). Thereafter, the original reading device 10 waits for a subsequent original feeding start time (which is a time similar to that in the embodiment 1) (No of S314), and when the subsequent original feeding start time has elapsed (Yes of S314), the controller 80 discriminates whether or not the original is still present on the original tray 121 (S315). In the case where the original is present on the original tray 121 (Yes of S315), the process returns to the step S310, and the feeding and the reading of the original are repetitively carried out with the step S315. In the step S315, when the controller 80 discriminated that the original is absent on the original tray 121 (No of S315), the original in the original reading device 10 is discharged onto the discharge tray 122 (S316). Thereafter, the front surface reading unit 104 is caused to go to the stand-by state (S317), and the screen of the display portion 91 is switched to a stand-by screen (FIG. 9) (S318). Then, initialization of the number of times of continuous stops and the discrimination flag in the RAM (A) 303 is performed (S319), so that the original reading process is ended.

On the other hand, in the step S311, in the case where the reading setting for the small size is stored in the RAM (A) 303 (Yes of S311), the process goes to the step 320 shown in FIG. 19. That is, after the original feeding is started, whether or not the second original presence/absence detecting sensor 205 is turned on is discriminated (S320). In the case where the turning-on of the second original presence/absence detecting sensor 205 is not detected (No of S320), whether or not the turning-on of the post-separation sensor 207 is detected is discriminated (S321). In the case where the turning-on of the second original presence/absence detecting sensor 205 is not detected but the turning-on of the post-separation sensor 207 is detected (Yes of S321), it becomes definite that the original has the small size. For that reason, the feeding is continued as it is, and the process goes to the step S312 of FIG. 18 and thereafter the feeding of the original and the reading control are carried out similarly as described above. That is, thereafter, depending on the reading setting for the small size, the respective roller pairs (sheet feeding means) and the front surface reading unit 104 (image reading means) and carried out in the operation in a second reading mode in which these means are controlled by an image reading operation depending on the small size.

In the step S320 of FIG. 19 described above, in the case where before the turning-on of the post-separation sensor 207 is detected (No of S321), the turning-on of the second original presence/absence detecting sensor 205 is detected (Yes of S320), the feeding of the original is stopped (S322). The case where the feeding of the original is stopped, is the case where although the size of the original is discriminated as the small size before the feeding of the original is started and the reading process is started in the reading setting for the small size, the original is discriminated as the original with the large size after the feeding of the original is started. In this case, it is doubtful that the original was obliquely stacked on the original tray 121 and that the original of which corner of the free end portion is folded is stacked on the original tray 121, and therefore, on the display portion 91, a message of "re-setting of original" shown in FIG. 11 is displayed on a screen, so that the user is prompted to perform the re-setting (S323). Thereafter, the original reading device 10 is on stand-by until the turning-off of both the first original presence/absence detecting sensor 204 and the second original presence/absence detecting sensor 205 is detected, i.e., is once on stand-by for removal of the original from the original tray 121 (No of S324). In the case where the turning-off of both the first original presence/absence detecting sensor 204 and the second original presence/absence detecting sensor 205 is detected (Yes of S324), on the display portion 91, a message of "return original to first sheet" shown in FIG. 12 is displayed (S325). That is, the user is notified of that the user is prompted to return the original to the first sheet.

Then, the number of times of continuous stops in the RAM (A) 303 is added by "1" (S326), and the controller 80 discriminates whether or not the number of times of continuous stops is not less than "2" which is a predetermined number of times (S327). In the case where the number of times of continuous stops is less than "2" (No of S327), the process goes to the above-described step S301, the original reading device 10 is on stand-by until the original is set again on the original tray 121 (No of S301). Thereafter, similar control is carried out for the original set again. Incidentally, in this embodiment, whether or not the number of times of continuous stops is not less than "2" which is the predetermined number of times is discriminated, but this predetermined number of times may also be any number of times.

On the other hand, in the step S327, in the case where the number of times of continuous stops is "2" or more (Yes of S327), the process goes to S328. This case is the case where when returns the re-setting of the original is performed once again, the original size was discriminated as the small size before the start of the original feeding but was detected as the large size after the start of the original feeding. Therefore, as the reading setting, the reading setting for the large size is forcedly set in the image processor (A) 306 (S328), and the turning-off of the discrimination flag is stored in the RAM (A) 303 (S329). Then, the process goes to the step S301 again. At this time, the discrimination flag is turned off, so that the turning-on of the first original presence/absence detecting sensor 204 is detected (Yes of S301) and the re-setting of the original is discriminated. Thereafter, the controller 80 discriminates that the discrimination flag is not turned on (No of S302). By this, the process does not go to the step S304, so that the reading setting is not changed to the reading setting for the small size. Thereafter, in a state in which the reading setting is set at the reading setting for the large size (S328, S305), subsequent steps of the original reading control are carried out. That is, thereafter, an operation in the first reading mode in which in accordance with the reading setting for the large size, control of the respective roller pairs (sheet feeding means) and the front surface reading unit 104 (image reading means) is carried out by the image reading operation depending on the large size is performed.

As described above, in the third embodiment, when the original size is discriminated as the small size before the start of the original feeding and then is detected as the large size after the start of the original feeding and the process of the stop of the original feeding is continued, as the reading setting, the reading setting for the large size is forcedly selected. By this, even in the case where the user repeats the re-setting of the original in a state in which the side restricting plates 125A and 125B do not contact the opposite ends of the original with respect to the widthwise direction, the reading of the original can be carried out by proper control without excessively stopping the feeding of the original.

Incidentally, in this third embodiment, in the case where the discrimination flag is turned off in the number of times exceeding the upper limit of the number of times of continuous stops, as the reading setting, the reading setting for the large size is forcedly selected, but the reading setting for the small size may also be selected.

Fourth Embodiment

Then, a fourth embodiment in which the above-described first embodiment is partially changed will be described using FIGS. 20 and 21. In this fourth embodiment, in the case where the original size is discriminated as the small size before the start of the original feeding, the original size is discriminated after the start of the original feeding and then reading setting is made, and in the case where the original size is discriminated as the large size before the start of the original feeding, the original feeding is started after the reading setting is started. Incidentally, the start of the original feeding is synonymous with preparation of the image reading operation by the front surface reading unit 104. Accordingly, it can be said that execution of the reading setting before the start of the original feeding is the operation in the first preparation mode and that execution of the reading setting after the start of the original feeding is the operation in the second preparation mode. Further, in the case where the original size is discriminated as the large size before the start of the original feeding, the start of the reading setting and the start of the original feeding may also be carried out at the same time.

Incidentally, also in the description of the fourth embodiment, portions similar to those in the first embodiment will be briefly described or omitted from description. Constitutions of the printer 100 and the original reading device 10 in this embodiment are similar to those in the first embodiment, and particularly, the positional relationship between the first original presence/absence detecting sensor 204 and the second original presence/absence detecting sensor 205 is also similar to that in the first embodiment.

[Original Reading Control in Fourth Embodiment]

As shown in FIG. 20, first, the original reading device 10 is on stand-by until the first original presence/absence detecting sensor 204 is turned on, i.e., until the user sets the original on the original tray 214 (No of S400). When the turning-on of the first original presence/absence detecting sensor 204 is detected (Yes of S400), the controller 80 discriminates whether or not the second original presence/absence detecting sensor 205 is turned on, i.e., whether the size of the set original is the large size or the small size (S401). In the case where the second original presence/absence detecting sensor 205 is turned on (Yes of S401), the original size is discriminated as the large size, and the reading setting for the large size is stored in the RAM (A) 303, i.e., the operation in the first preparation mode is carried out (S403). On the other hand, in the case where the second original presence/absence detecting sensor 205 is turned off (No of S401), the original size is discriminated as the small size, and the reading setting for the small size is stored in the RAM (A) 303 (S402).

Then, the original reading device 10 is on stand-by for the start operation of the reading operation by the user (No of S404). In this period in this embodiment, the discrimination flag is turned on and therefore, the detection by the first original presence/absence detecting sensor 204 and the second original presence/absence detecting sensor 205 are continued, and when sensor input is changed, the reading setting for the small size or the reading setting for the large size is renewed.

When the controller 80 receives the start operation of the reading operation (Yes of S404), the controller 80 discriminates whether or not the reading setting stored in the RAM (A) 303 is the reading setting for the small size (S405). In the case where the reading setting stored in the RAM (A) 303 is the reading setting for the large size (No of S405), the scanning screen is displayed (FIG. 10) (S430), and then the reading setting stored in the RAM (A) 303 is set in the image processor (A) 306 (S431). Then, the reading preparation of the front surface reading unit 104 is started (S432), and the original feeding is started by lowering the pick-up roller 111 (S433), and then the process goes to a step S413 shown in FIG. 21 described later.

On the other hand, in the above-described step S505, in the case where the reading setting stored in the RAM (A) 303 is the reading setting for the small size (Yes of S405), the scanning screen is displayed (FIG. 10) (S406). Then, the original feeding is started by lowering the pick-up roller 111 without performing the preparation of the front surface reading unit 104, i.e., the operation in the second preparation mode is carried out (S407).

Then, the feeding is continued until the turning-on of the post-separation sensor 207 is detected (No of S408), and when the post-separation sensor 207 is turned on (Yes of S408), the controller 80 discriminates whether or not the second original presence/absence detecting sensor 205 is turned on (S409). In the case where the second original presence/absence detecting sensor 205 is turned off (No of S409), the reading setting for the small size is set in the image processor (A) 306 (S410). In the case where the second original presence/absence detecting sensor 205 is turned on (Yes of S409), the reading setting for the large size is set in the image processor (A) 306 (S411). Then, the reading preparation of the front surface reading unit 104 is performed in the selected reading setting (i.e., in the second preparation mode) (S412), and then the process goes to a step S413 shown in FIG. 21.

As shown in FIG. 21, when the process goes to the step S413, the original reading device 10 is on stand-by until the reading preparation is completed, i.e., until the turning-on of the LED 105, the actuation of the reading sensor 108, and the movement of the front surface reading unit 104 to the position of the platen glass 102 are completed (No of S413). In the case where the reading preparation of the front surface reading unit 104 is completed (Yes of S413), the feeding is continued until the timing-on of the lead sensor 210 is detected (No of S414). When the lead sensor 210 is turned on (Yes of S414), the reading of the original is started by the front surface reading unit 104 (S415). Thereafter, the original reading device 10 waits for a subsequent original feeding start time (which is a time similar to that in the embodiment 1) (No of S416), and when the subsequent original feeding start time has elapsed (Yes of S416), the controller 80 discriminates whether or not the original is still present on the original tray 121 (S417). In the case where the original is present on the original tray 121 (Yes of S417), feeding of a subsequent original is started (S418) and the process returns to the step S414, and the feeding and the reading of the original are repetitively carried out with the step S417. In the step S417, when the controller 80 discriminated that the original is absent on the original tray 121 (No of S417), the original in the original reading device 10 is discharged onto the discharge tray 122 (S419). Thereafter, the front surface reading unit 104 is caused to go to the stand-by state (S420), and the screen of the display portion 91 is switched to a stand-by screen (FIG. 9) (S421). Then, the original reading process is ended.

As described above, in the fourth embodiment, in the case where the original size is discriminated before the start of the original feeding, the feeding of the original is carried out early, and after the feeding of the original is started, the reading preparation is carried out depending on the detected original size. For this reason, between before and after the start of the feeding of the original, even in the case where discrimination of the original size is changed from the small size to the large size, proper control can be carried out, so that the original can be properly read.

Other Embodiments

In the above-described first to fourth embodiments, the case of the front surface reading in which only the front surface of the image of the original is read was described, but the present invention is not limited thereto, and even in double-side reading in which both the front surface and the back surface are read, similar control can be carried out.

Further, in the first to third embodiments, the constitution in which in the case where the original size is discriminated as the small size before the start of the original feeding and then is discriminated as the large size after the start of the original feeding, the original feeding is stopped and the user is notified of the re-setting of the original by the display portion 91 was described. However, the notification prompting the re-setting of the original may also be carried out by an external terminal such as a computer electrically connected to the printer. Further, the contents of the notification are also limited to the notification prompting the re-setting of the original but may also be, for example, notification prompting a check of the original.

Further, in the fourth embodiment, the constitution in which in the case where the original size is discriminated as the small size before the start of the original feeding and is then discriminated as the large size after the start of the original feeding the reading setting is made after the start of the original feeding without stopping the original feeding was described. However, in the case where the original size is discriminated as the small size before the start of the original feeding and is then discriminated as the large size after the start of the original feeding, the feeding of the original may also be once stopped. In this case, the user is notified of a message by which whether or not the original feeding is continued as it is selected by the user, and in the case where the continuation of the original feeding is selected by the user, the original feeding may also be resumed as it is by the user.

Further, features of the respective pieces of the original reading control in the first to fourth embodiments may also be combined with each other in any manner.

In the first to fourth embodiment, the constitution in which the size of the original set on the original tray 121 is detected by the first original presence/absence detecting sensor 204 and the second original presence/absence detecting sensor 205 was described. However, the present invention is not limited thereto, but a constitution in which the size of the sheet set on, for example, a manual feeding tray or the like is detected by two detecting sensors for detecting the presence or absence of the sheet may also be employed.

Further, in the first to fourth embodiments, the constitution in which the first original presence/absence detecting sensor 204 and the second original presence/absence detecting sensor 205 are disposed upstream of the restricting plate 130 and downstream of the pick-up roller 111 with respect to the feeding direction was described. However, the present invention is not limited thereto, but the first original presence/absence detecting sensor 204 and the second original presence/absence detecting sensor 205 may also be disposed at any position when these sensors can be disposed inside the apparatus main assembly 110 and wiring thereof can be installed inside the apparatus main assembly 110.

Further, in the first to fourth embodiments, the constitution in which the case where the original is set, the positions of the original with respect to the widthwise direction are restricted by the side restricting plates 125A and 125B was described. However, the present invention is not limited thereto, but a constitution in which recessed-shaped groove portions corresponding to the small size and the large size are provided, for example, the original tray 121 and the positions of the original with respect to the widthwise direction are restricted by the groove portions may also be employed. Further, the constitution in which when the widthwise positions of the original are restricted by the side restricting plates 125A and 125B, on the basis of the center side with respect to the widthwise direction, positioning of the side restricting plates 125A and 125B is made so that the feeding center is the same even when the sizes of originals with respect to the widthwise direction are different from each other was described. However, the present invention is not limited thereto, but a structure of a so-called cantilever type in which one side restricting plate is fixed and the other side restricting plate is movable may also be employed. Even in this case, it may only be required that the first original presence/absence detecting sensor 204 is disposed within a first range corresponding to the small size with respect to the widthwise direction and the second original presence/absence detecting sensor 205 is disposed outside the first range and within a second range corresponding to the large size with respect to the widthwise direction.

In the first and fourth embodiments, the constitution in which the control of the feeding and the reading is carried out on the basis of the discrimination of the original size was described, but a constitution in which a discrimination result of the original size is displayed or the like on the display portion 91 may also be employed.

In the first to fourth embodiments, the constitution in which the first original presence/absence detecting sensor 204 is an original presence/absence detecting sensor for detecting the presence or absence of the original was described, but the present invention is not limited thereto, and another original presence/absence detecting sensor may also be provided separately from the first original presence/absence detecting sensor 204.

In the first to fourth embodiments, the constitution in which the first original presence/absence detecting sensor 204 and the second original presence/absence detecting sensor 205 detect the original by rotating the detecting members thereof was described. However, the present invention is not limited thereto, but for example, a constitution in which the presence or absence of the original is directly detected by a photo-sensor may also be employed, i.e., the first and second original presence/absence detecting sensor may also be any sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-004750 filed on Jan. 15, 2020, which is hereby incorporated by reference herein in its entirety.

What is claimed is:

1. A sheet conveyance apparatus comprising:
a sheet supporting tray configured to support a sheet;
a pick-up roller configured to feed a sheet stacked on the sheet supporting tray, in a feeding direction, with the pick-up roller being in contact with the sheet;
a separation feeding unit configured to separate and feed the sheet fed by the pick-up roller in a separation nip;
a first sheet detecting sensor configured to detect the sheet stacked on the sheet supporting tray at a first detecting position;
a second sheet detecting sensor configured to detect the sheet stacked on the sheet supporting tray at a second detecting position farther from a central portion of the sheet supporting tray in a widthwise direction that is orthogonal to the feeding direction than the first detecting position is from the central portion of the sheet supporting tray in the widthwise direction that is orthogonal to the feeding direction; and
a control unit configured to control drive of the pick-up roller and drive of the separation feeding unit,
wherein, in a case that after the feeding of the sheet stacked on the sheet supporting tray starts, the first sheet detecting sensor detects the sheet and the second sheet detecting sensor does not detect the sheet, and then the sheet is detected by the second sheet detecting sensor during feeding of the sheet, the control unit stops the feeding of the sheet.

2. A sheet conveyance apparatus according to claim 1, further comprising a display portion configured to display a message to the effect that the sheet is stacked on the sheet supporting tray after the control unit stops the feeding of the sheet.

3. A sheet conveyance apparatus according to claim 1, wherein the first detecting position and second detecting position are provided downstream of a sheet contact position of the pick-up roller and upstream of the separation nip with respect to the feeding direction.

4. A sheet conveyance apparatus according to claim 1, wherein the first sheet detecting sensor includes a first detecting member and is configured to detect the sheet by rotation of the first detecting member, and
wherein the second sheet detecting sensor includes a second detecting member and is configured to detect the sheet by rotation of the second detecting member.

5. A sheet conveyance apparatus according to claim 1, wherein, in a case that the sheet stacked on the sheet supporting tray is detected by the first and second sheet detecting sensors, the control unit controls the drive of the pick-up roller and the drive of the separation feeding unit so that the sheet is fed at a first feeding speed, and
wherein, in a case that the sheet stacked on the sheet supporting tray is detected by the first sheet detecting sensor but is not detected by the second sheet detecting sensor, the control unit controls the drive of the pick-up roller and the drive of the separation feeding unit so that the sheet is fed at a second feeding speed that is slower than the first feeding speed.

6. An image reading apparatus comprising:
a sheet supporting tray configured to support a sheet;
a pick-up roller configured to feed a sheet stacked on the sheet supporting tray, in a feeding direction, with the pick-up roller being in contact with the sheet;
a separation feeding unit configured to separate and feed the sheet fed by the pick-up roller in a separation nip;
a first sheet detecting sensor configured to detect the sheet stacked on the sheet supporting tray at a first detecting position;
a second sheet detecting sensor configured to detect the sheet stacked on the sheet supporting tray at a second detecting position farther from a central portion of the sheet supporting tray in a widthwise direction orthogonal to the feeding direction than the first detecting position is from the central portion of the sheet supporting tray in the widthwise direction orthogonal to the feeding direction;
a control unit configured to control drive of the pick-up roller and drive of the separation feeding unit; and
a reading unit configured to read an image of the sheet fed by the separation feeding unit,
wherein, in a case that after the feeding of the sheet stacked on the sheet supporting tray starts, the first sheet detecting sensor detects the sheet and the second sheet detecting sensor does not detect the sheet, and then the sheet is detected by the second sheet detecting sensor during feeding of the sheet, the control unit stops the feeding of the sheet.

* * * * *